United States Patent
Barnes et al.

(10) Patent No.: US 9,752,961 B2
(45) Date of Patent: Sep. 5, 2017

(54) DUAL-PURPOSE DYNAMOMETER

(71) Applicant: AVL TEST SYSTEMS, INC., Plymouth, MI (US)

(72) Inventors: Kenneth Cooper Barnes, Sedona, AZ (US); Stephen Gibson, Pinckney, MI (US)

(73) Assignee: AVL TEST SYSTEMS, INC., Plymouth, MI (US)

( * ) Notice: Subject to any disclaimer, the term of this patent is extended or adjusted under 35 U.S.C. 154(b) by 258 days.

(21) Appl. No.: 14/730,689

(22) Filed: Jun. 4, 2015

(65) Prior Publication Data
US 2015/0369702 A1 Dec. 24, 2015

Related U.S. Application Data

(60) Provisional application No. 62/014,350, filed on Jun. 19, 2014.

(51) Int. Cl.
*G01M 17/007* (2006.01)
*G01M 13/02* (2006.01)

(52) U.S. Cl.
CPC ...... *G01M 17/0072* (2013.01); *G01M 13/025* (2013.01); *G01M 17/0074* (2013.01)

(58) Field of Classification Search
None
See application file for complete search history.

(56) References Cited

U.S. PATENT DOCUMENTS

| 3,861,204 | A | * | 1/1975 | Fillingim | ...... G01M 17/0072 |
| | | | | | 73/116.06 |
| 3,910,109 | A | | 10/1975 | Pavlovsky et al. | |
| 4,466,294 | A | * | 8/1984 | Bennington | ...... G01M 15/044 |
| | | | | | 73/116.05 |

(Continued)

FOREIGN PATENT DOCUMENTS

| DE | 202010006682 U1 | 8/2010 |
| EP | 0124258 A2 | 11/1984 |
| JP | 2003065866 A | 3/2003 |

OTHER PUBLICATIONS

Extended European Search Report in corresponding European Application No. 15172577.7 dated Oct. 29, 2015, 10 pages.

*Primary Examiner* — Eric S McCall
(74) *Attorney, Agent, or Firm* — Harness, Dickey & Pierce, P.L.C.

(57) ABSTRACT

A dual-purpose dynamometer assembly is disclosed including a dynamometer motor, a chassis dynamometer roll that can be driven by a vehicle wheel, and a powertrain dynamometer shaft that can be driven by a vehicle powertrain. A gearbox is disposed between and rotatably couples the dynamometer motor with the chassis dynamometer roll and the powertrain dynamometer shaft. At least one chamber wall defining a test chamber is disposed between the dynamometer motor on one side and the chassis dynamometer roll and the powertrain dynamometer shaft on the other side such that the dynamometer motor is disposed outside of the test chamber. There is at least one aperture penetrating the chamber wall through which the dynamometer motor is connected to the chassis dynamometer roll and the powertrain dynamometer shaft. Accordingly, the dynamometer motor is isolated from extreme temperatures within the test chamber.

32 Claims, 14 Drawing Sheets

(56) References Cited

U.S. PATENT DOCUMENTS

| | | | |
|---|---|---|---|
| 4,669,318 A * | 6/1987 | Angstrom | G01L 3/20 |
| | | | 73/862.09 |
| 5,277,060 A | 1/1994 | Lehman et al. | |
| 5,323,644 A * | 6/1994 | Schaefer | G01M 17/06 |
| | | | 73/116.06 |
| 5,375,460 A * | 12/1994 | La Belle | G01M 17/0072 |
| | | | 73/116.06 |
| 5,465,612 A * | 11/1995 | La Belle | G01M 17/0072 |
| | | | 73/116.06 |
| 6,006,611 A * | 12/1999 | Galvin | G01L 3/242 |
| | | | 73/862.16 |
| 6,044,696 A * | 4/2000 | Spencer-Smith | G01M 17/007 |
| | | | 73/116.06 |
| 7,921,712 B1 * | 4/2011 | Rindler | G01M 13/02 |
| | | | 73/116.05 |
| 8,505,374 B1 * | 8/2013 | Arseneau | G01L 3/24 |
| | | | 73/116.05 |
| 2003/0159519 A1 | 8/2003 | Harada | |
| 2003/0221487 A1 * | 12/2003 | Silvagi | G01M 1/02 |
| | | | 73/462 |
| 2004/0200272 A1 * | 10/2004 | Bergst | G01L 5/282 |
| | | | 73/123 |
| 2009/0107254 A1 * | 4/2009 | Engstrom | F04D 19/007 |
| | | | 73/862 |
| 2009/0126510 A1 * | 5/2009 | Engstrom | G01L 3/20 |
| | | | 73/862.14 |
| 2009/0133484 A1 * | 5/2009 | Inoue | G01M 17/0074 |
| | | | 73/117.01 |
| 2011/0303000 A1 * | 12/2011 | Engstrom | G01M 17/0074 |
| | | | 73/116.06 |
| 2016/0313214 A1 * | 10/2016 | Takahashi | G01M 17/0074 |

\* cited by examiner

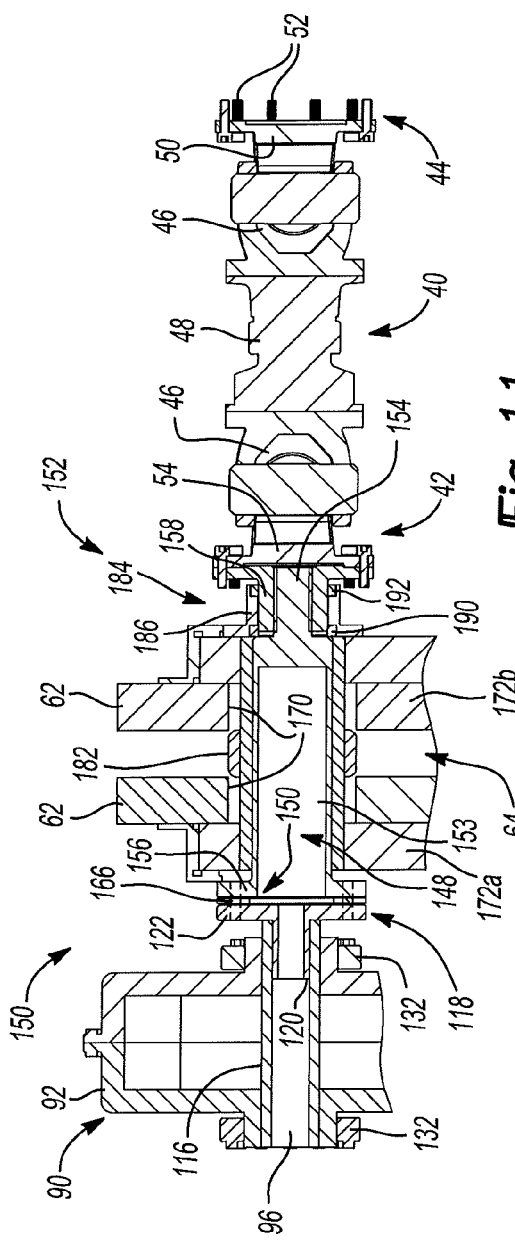
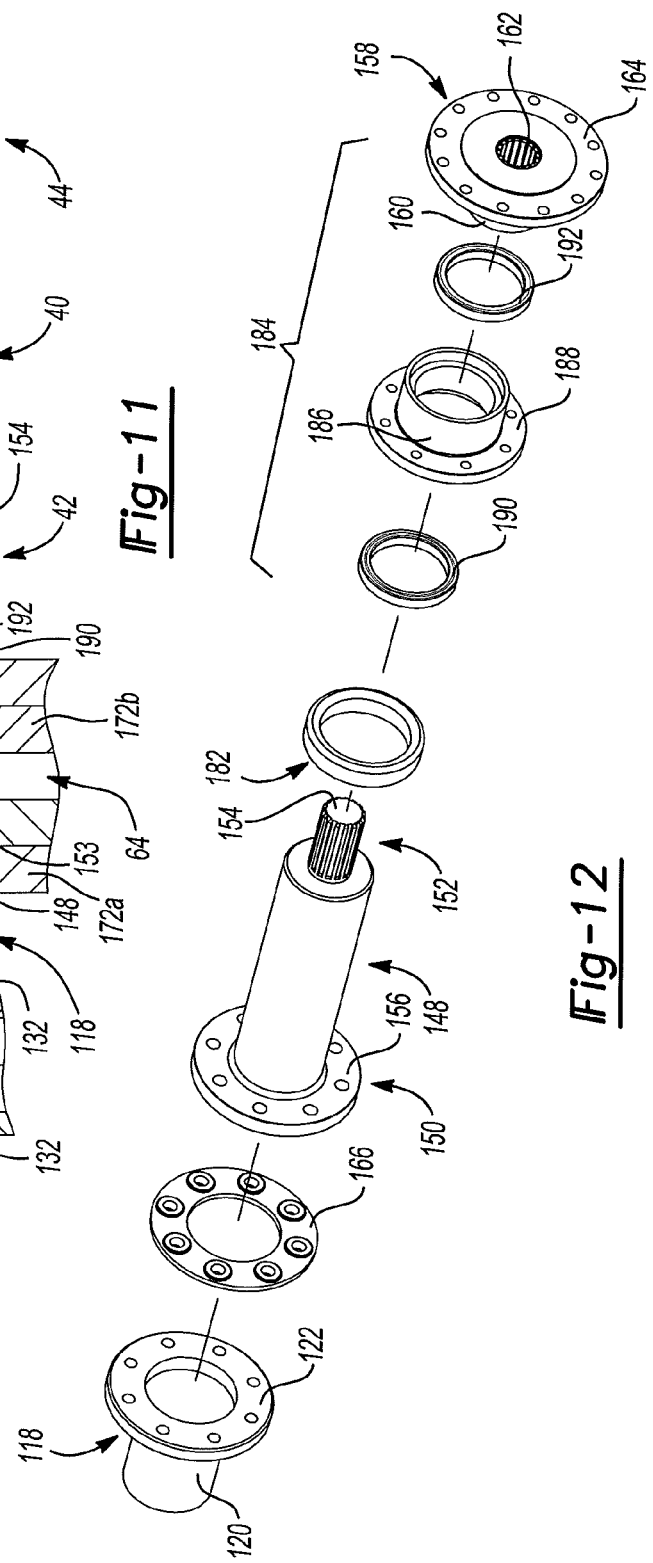
Fig-11
Fig-12

DUAL-PURPOSE DYNAMOMETER

CROSS-REFERENCE TO RELATED APPLICATIONS

This application claims the benefit of U.S. Provisional Application No. 62/014,350, filed on Jun. 19, 2014. The entire disclosure of the above application is incorporated herein by reference.

FIELD

The present disclosure generally relates to dynamometers. More particularly, a dual-purpose dynamometer assembly is disclosed, which may be used for vehicle testing.

BACKGROUND

This section provides background information related to the present disclosure and is not necessarily prior art.

Dynamometers, often referred to simply as "dynos," are devices that measure the performance of a machine. Most commonly, dynamometers are utilized to measure the performance of a vehicle, and more specifically, the power and torque generated by the vehicle's engine, which is typically transferred to the dynamometer through associated powertrain components. In addition to measuring power and torque, dynamometers can be used to determine friction and pumping losses or to simulate road loading conditions for emissions testing, durability testing, and extreme temperature testing.

There are several forms of dynamometers that are commonly used for vehicle testing. These include engine dynamometers, chassis dynamometers, and powertrain dynamometers. Engine dynamometers couple directly to the vehicle's engine and measure power and torque directly from the engine's crankshaft. Such engine dynamometers typically require the vehicle's engine to be removed from the vehicle and do not account for power losses in the vehicle's drivetrain, gearbox, transmission, or differential. Accordingly, engine dynamometers are typically used by engine manufacturers to test engines before they are installed in a vehicle. Chassis dynamometers generally include a chassis dynamometer roll that is driven by the drive wheels of the vehicle during testing. Chassis dynamometers measure the power delivered to the chassis dynamometer roll by the drive wheels of the vehicle. As such, chassis dynamometers are sometimes referred to as "rolling road" dynamometers because the rotating chassis dynamometer roll simulates on-road operation. Advantageously, chassis dynamometers can be quickly and easily set up and they account for the friction losses associated with the vehicle's drivetrain, thereby providing better approximations of on-road performance.

Before testing, the vehicle can simply be driven up onto the chassis dynamometer rolls and anchored in place. Thus, there is no need to remove the engine from the vehicle for testing. However, some disadvantages of chassis dynamometers include tire wear, which can occur during longer endurance and durability tests, and wheel slip, which can occur between the wheel and the chassis dynamometer roll, resulting in less accurate measurements.

Powertrain dynamometers generally include a powertrain dynamometer shaft that is driven by at least one powertrain component of the vehicle during testing. Typically, the powertrain dynamometer shaft is connected to the hubs of the vehicle for direct power and torque measurement from the vehicle's drive axle. Although the vehicle must be raised on jacks and have its wheels removed before the powertrain dynamometer can be connected, there is no potential for tire wear or wheel slip with this type of dynamometer. In some instances the powertrain dynamometer has special bearings that can support the full weight of the vehicle which allows the vehicle suspension to attain the same position that it would on the road.

All of these various types of dynamometers have some form of dynamometer motor. The dynamometer motor includes a motor shaft that is rotatably coupled to the driven component(s) of the dynamometer. Such dynamometer motors provide power and torque measurements and are typically large components that increase in size as their maximum load range increases. Accordingly, the dynamometer motors used to test heavy duty and multi-axle vehicles take up significant space. Although portable dynamometers exist, many dynamometers are situated inside a test chamber. This is particularly true where vehicle testing requires runs at specific temperatures. For example, many modern day tests require vehicle testing at extreme temperatures including very low temperatures such as −65° C. (Celsius). Test chambers are thus defined by at least one chamber wall that isolates the vehicle from ambient temperatures. Climate control equipment controls the temperature within the test chamber such that the vehicle can be tested at extreme temperatures. Such test chambers are typically large in size because they must provide enough room for not only the vehicle, but also the entire dynamometer assembly, including the dynamometer motor. Also, many test chambers are constructed such that separate chassis dynamometers and powertrain dynamometers can be arranged within the test chamber. This allows use of either type of dynamometer depending on the specific criteria of a particular test without having to move equipment into and out of the test chamber.

The size of such test chambers thus becomes problematic from a climate control standpoint. It becomes very costly to maintain the test chamber at extreme temperatures during a test given the large volume of air within the test chamber that must be heated or cooled. Stated another way, large amounts of energy are consumed in order to maintain large test chambers at extreme temperatures during testing.

SUMMARY

This section provides a general summary of the disclosure, and is not a comprehensive disclosure of its full scope or all of its features.

The present disclosure provides a dual-purpose dynamometer assembly that occupies less space in a test chamber and has the capability to function as both a chassis dynamometer and a powertrain dynamometer. Such a dual-purpose dynamometer assembly may generally be used for testing a vehicle that has at least one wheel and/or at least one powertrain component driving the wheel(s).

The dual-purpose dynamometer assembly has a chassis dynamometer roll that can engage and be driven by the at least one wheel of the vehicle during testing. A chassis dynamometer axle supports the chassis dynamometer and is rotatably coupled with the chassis dynamometer roll. The dual-purpose dynamometer also includes a powertrain dynamometer shaft that is spaced from the chassis dynamometer axle. The powertrain dynamometer shaft includes an input flange that can mate with and be driven by the at least one powertrain component of the vehicle during testing. A dynamometer motor including a motor shaft is rotatably coupled to at least one of the chassis dynamometer axle and the powertrain dynamometer shaft. At least one of the chassis dynamometer roll and the powertrain dynamometer shaft are disposed within the test chamber, which is defined by at least one chamber wall. The at least one chamber wall isolates the vehicle from ambient temperatures such that the vehicle can be tested at extreme temperatures within the test chamber.

The dual-purpose dynamometer assembly further includes a gearbox disposed between and rotatably coupling the dynamometer motor with the chassis dynamometer axle and the powertrain dynamometer shaft. The at least one chamber wall is disposed between the dynamometer motor on one side and at least one of the chassis dynamometer roll and the powertrain dynamometer shaft on the other side such that the dynamometer motor is disposed outside of the test chamber. Accordingly, the dynamometer motor is isolated from extreme temperatures within the test chamber. There is at least one aperture penetrating the at least one chamber wall through which the dynamometer motor is connected to at least one of the chassis dynamometer roll and the powertrain dynamometer shaft.

Advantageously, the dual-purpose dynamometer assembly disclosed herein allows easy switching between chassis dynamometer testing and powertrain dynamometer testing based on the criteria for the test. The dual-purpose dynamometer assembly utilizes the same dynamometer motor for both chassis dynamometer testing and powertrain dynamometer testing, thereby reducing cost and complexity. This also provides smaller packaging size, which is advantageous because the volume and, thus, energy consumption of the test chamber can be reduced. It should be appreciated that the volume of the test chamber can be reduced because room for separate chassis dynamometers and powertrain dynamometers is not required. The volume of the test chamber may also be reduced because the disclosed dual-purpose dynamometer assembly places the dynamometer motor outside the test chamber. Accordingly, the test chamber need not be much wider than the width of the vehicle being tested. This all results in a smaller test chamber where less energy is required to maintain extreme temperatures within the test chamber during testing. As an added benefit, the size, cost, and complexity of the dynamometer motor may also be reduced because the dynamometer motor does not need to be capable of withstanding extreme temperatures. Insulation and other temperature conditioning features can be eliminated from the dynamometer motor because its location outside of the test chamber places the dynamometer motor in ambient temperatures.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 11 is a partial cross-sectional view of a portion of the exemplary dual-purpose dynamometer assembly shown in FIG. 10 take along line 11-11 of FIG. 10 where the second gearbox shaft, second gearbox coupler, powertrain dynamometer jackshaft, wall mount bearing assembly, powertrain dynamometer coupler, and powertrain dynamometer shaft are illustrated;

FIG. 12 is a side exploded perspective view of the powertrain dynamometer jackshaft, wall mount bearing assembly, and powertrain dynamometer coupler shown in FIG. 11;

DETAILED DESCRIPTION

Figure 1:
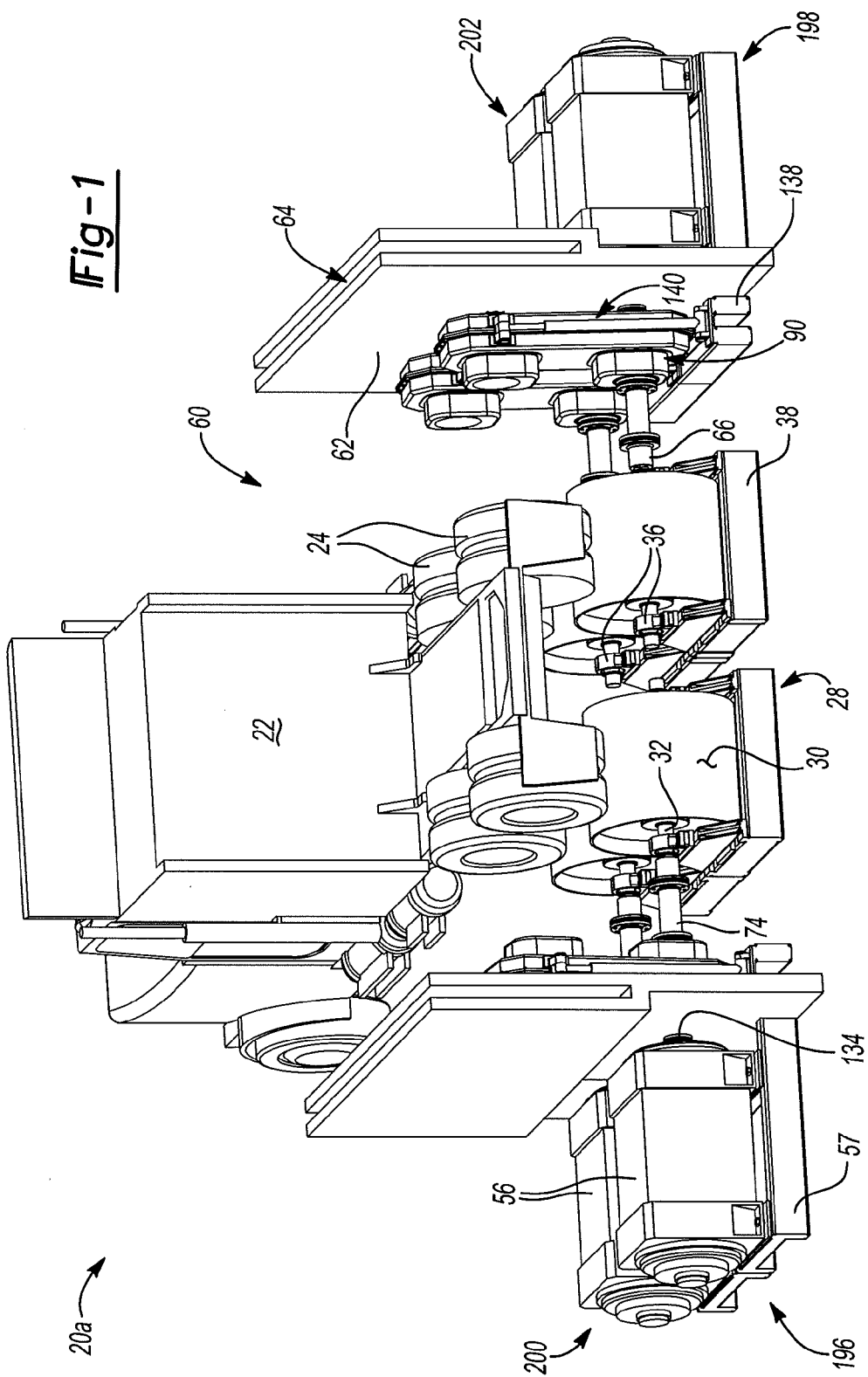
FIG. 1 is a side perspective view of an exemplary dual-purpose dynamometer assembly constructed in accordance with the present disclosure wherein a vehicle is being tested using the chassis dynamometer rolls of the dual-purpose dynamometer assembly.

Referring to the Figures, wherein like numerals indicate corresponding parts throughout the several views, several dual-purpose dynamometer assemblies 20a, 20b, 20c are disclosed. Such dual-purpose dynamometer assemblies 20a, 20b, 20c may be used in vehicle testing to evaluate the performance and reliability of a vehicle 22. It should be appreciated that the vehicle 22 being tested with the disclosed dual-purpose dynamometer assemblies 20a, 20b, 20c may have one ore more wheels 24 and one or more powertrain components 26 that drive the wheel(s) 24. By way of example and without limitation, the vehicle 22 may be an automobile, heavy duty truck, or multi-axle vehicle. The term "wheel" as used herein is inclusive of the rim and/or tire of the vehicle 22 and is not meant to be limited to one or the other. The term "powertrain component" encompasses a range of powertrain components 26 including without limitation the engine, transmission, hubs, and axles of the vehicle 22. Therefore, it should be understood that the term "powertrain" as used herein is inclusive of drivetrain components.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
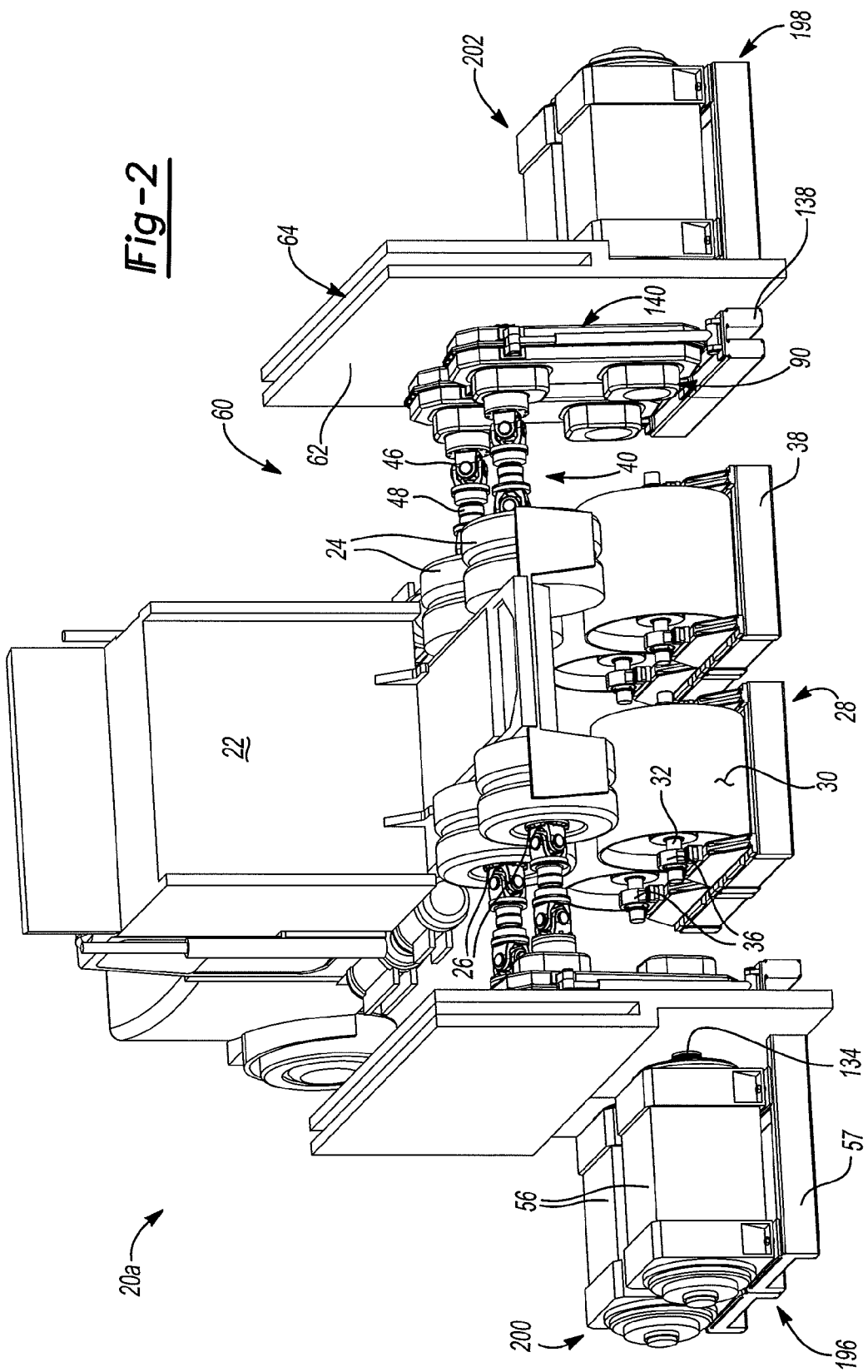
FIG. 2 is a side perspective view of the exemplary dual-purpose dynamometer assembly shown in FIG. 1 wherein the vehicle is being tested using the powertrain dynamometer shafts of the dual-purpose dynamometer assembly.
Figure 3:
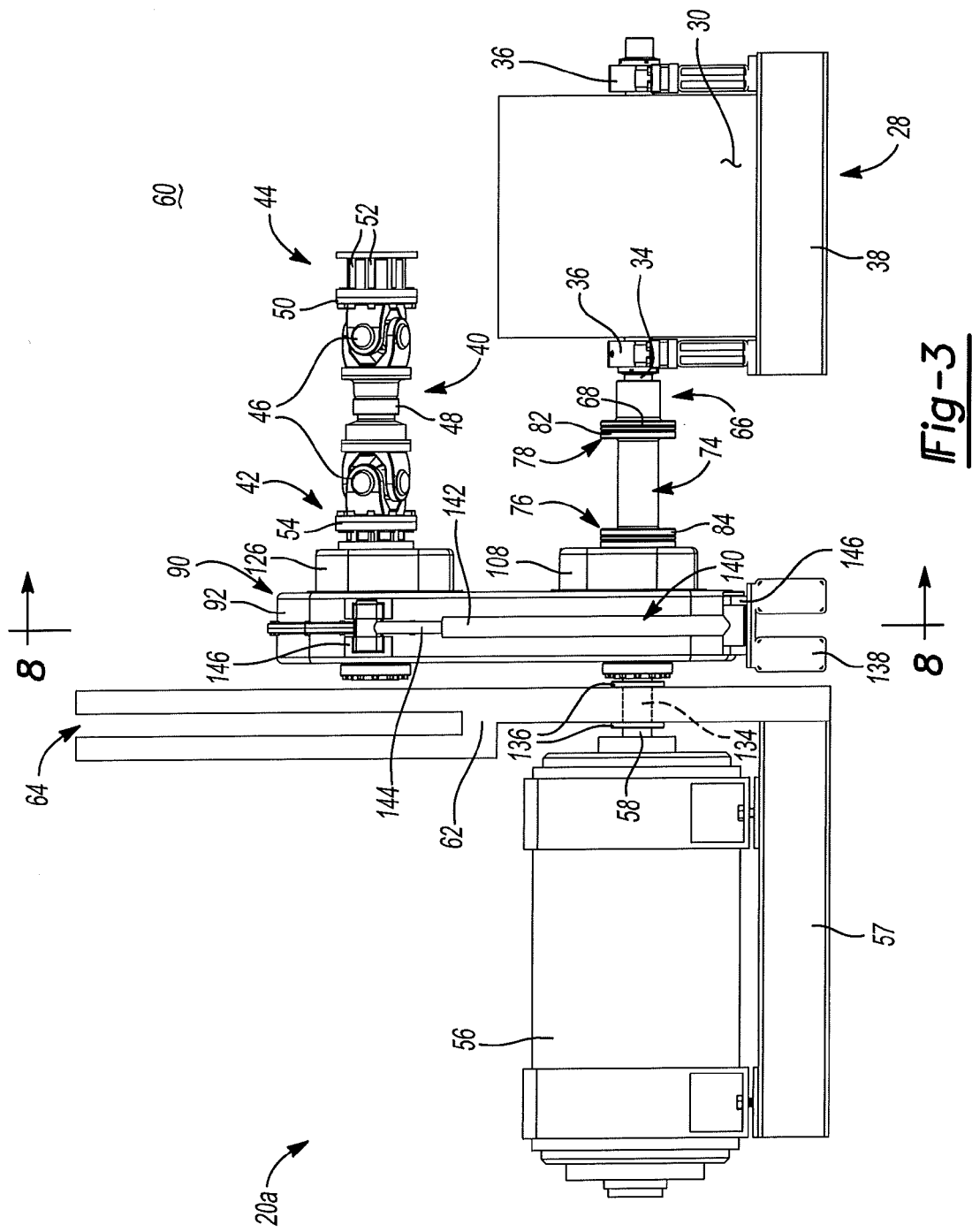
FIG. 3 is a side elevation view of an exemplary dual-purpose dynamometer assembly constructed in accordance with the present disclosure.

Referring to FIGS. 1-8, the dual-purpose dynamometer assembly 20a includes a chassis dynamometer roll 28. Generally, the chassis dynamometer roll 28 has a cylindrical shape and presents an outer surface 30 that can engage and be driven by the one or more wheel(s) 24 of the vehicle 22 during testing. More specifically, the wheel(s) 24 may rest on the chassis dynamometer roll 28 such that the chassis dynamometer roll 28 spins with the wheel(s) 24 of the vehicle 22. A chassis dynamometer axle 32 extends co-axially through and supports the chassis dynamometer roll 28. The chassis dynamometer axle 32 is rotatably coupled with the chassis dynamometer roll 28 and may present a coupling end 34 (FIG. 3). A pair of chassis dynamometer bearing assemblies 36 may be disposed on either side of the chassis dynamometer roll 28 that circumscribe and support the chassis dynamometer axle 32. The pair of chassis dynamometer bearing assemblies 36 permit free rotation of the chassis dynamometer axle 32 and the chassis dynamometer roll 28. A chassis dynamometer frame 38 is connected to and supports the pair of chassis dynamometer bearing assemblies 36. Accordingly, the chassis dynamometer frame 38 ultimately supports the chassis dynamometer axle 32 and, thus, the chassis dynamometer roll 28.

The dual-purpose dynamometer assembly 20a may also include a powertrain dynamometer shaft 40 (FIG. 2). The powertrain dynamometer shaft 40 may generally be vertically spaced from the chassis dynamometer axle 32 and extends between a proximal end 42 and a distal end 44 that is opposite the proximal end 42 (FIG. 3). The powertrain dynamometer may include one or more universal joint(s) 46 that is disposed between the proximal end 42 of the powertrain dynamometer shaft 40 and the distal end 44 of the powertrain dynamometer shaft 40. The universal joint(s) 46 provide adjustable positioning of the powertrain dynamometer shaft 40 relative to the powertrain component(s) 26 of the vehicle 22. As best seen in FIG. 3, the powertrain dynamometer shaft 40 may include two universal joints 46 each comprising two "U" shaped yokes that are rotatably coupled with each other in an interleaving arrangement by a cross shaft or pin having a cross-like shape. The two universal joints 46 of the powertrain dynamometer shaft 40 may be axially spaced from each other by an intermediary segment 48 that is generally cylindrical in shape. The distal end 44 of the powertrain dynamometer shaft 40 includes an input flange 50. The input flange 50 of the powertrain dynamometer shaft 40 presents a plurality of protrusions 52 circumferentially spaced about the input flange 50 that allow the input flange 50 to mate with and be driven by the powertrain components 26 of the vehicle 22 during testing. The powertrain component(s) 26 of the vehicle 22 may have sections that protrude therefrom and the plurality of protrusions 52 of the input flange 50 accommodate these protruding sections of the powertrain component(s) 26 of the vehicle 22. The proximal end 42 of the powertrain dynamometer shaft 40 includes an output flange 54.

The dual-purpose dynamometer assembly 20a also includes a dynamometer motor 56. The dynamometer motor 56 is supported on a dynamometer motor frame 57. The dynamometer motor 56 generally includes a motor shaft 58 that is rotatably coupled to at least one of: (i) the chassis dynamometer axle 32, and (ii) the powertrain dynamometer shaft 40. It should be appreciated that when in use, the dynamometer motor 56 measures the force, moment of force (i.e., torque), or power applied to the chassis dynamometer roll 28 or the powertrain dynamometer shaft 40 by the wheel(s) 24 or the powertrain component(s) 26 of the vehicle 22. Other measurements can also be measured by the dynamometer motor 56 including, but not limited to, the friction generated by the powertrain component(s) 26 and the pumping losses of the engine of the vehicle 22. In other words, the dynamometer motor 56 generally measures the performance of the vehicle 22. While various types of dynamometer motors 56 may be used, the dynamometer motor 56 may be without limitation an electric motor/generator that uses alternating current (AC) or direct current (DC). In accordance with this configuration, the dynamometer motor 56 can generate electricity by being driven by the wheel(s) 24 or the powertrain component(s) 26 of the vehicle 22. The electricity generated can then be measured to determine the force, torque, and power generated by the vehicle 22. Alternatively, the dynamometer motor 56 can draw electricity to drive the wheel(s) 24 or the powertrain component(s) 26 of the vehicle 22 or to create a simulated load. The electrical current that the dynamometer motor 56 draws is controlled and measured to calculate power, friction losses, and/or pumping losses. Of course, the use of other types of dynamometer motors is possible and is considered to be within the scope of the present disclosure.

The dual-purpose dynamometer assembly 20a may generally include a test chamber 60 defined by one or more chamber walls 62. When the dual-purpose dynamometer assembly 20 is being used to test the vehicle 22, the chamber wall 62 generally encloses the vehicle 22 and isolates the vehicle 22 from ambient temperatures. As such, the chamber wall 62 insulates the test chamber 60 from ambient temperatures of the surrounding environment so that the vehicle 22 can be tested at extreme temperatures within the test chamber 60. Such extreme temperatures include both high and low-temperature testing. Further, it should be appreciated that the dual-purpose dynamometer assembly 20a disclosed may be used to test the vehicle 22 at ambient or close to ambient temperatures instead of or in addition to testing the vehicle 22 at extreme temperatures. It should be appreciated that the chamber wall 62 may have a variety of different shapes, forms, and constructions. By way of example and without limitation, the chamber wall 62 may have a single-piece construction that encloses the test chamber 60. Alternatively, the chamber wall 62 may be formed of a plurality of wall sections that are joined together to form the test chamber 60. The chamber wall 62 may also be configured as a double wall with an air gap 64 disposed between two wall sections. This air gap 64 provides good thermal insulating properties such that less energy is required to maintain extreme temperatures within the test chamber 60. It should further be appreciated that the test chamber 60 itself may be entirely defined by the chamber wall 62 or, alternatively, the test chamber 60 may also be bounded by a floor and a ceiling (neither shown).

Figure 7:
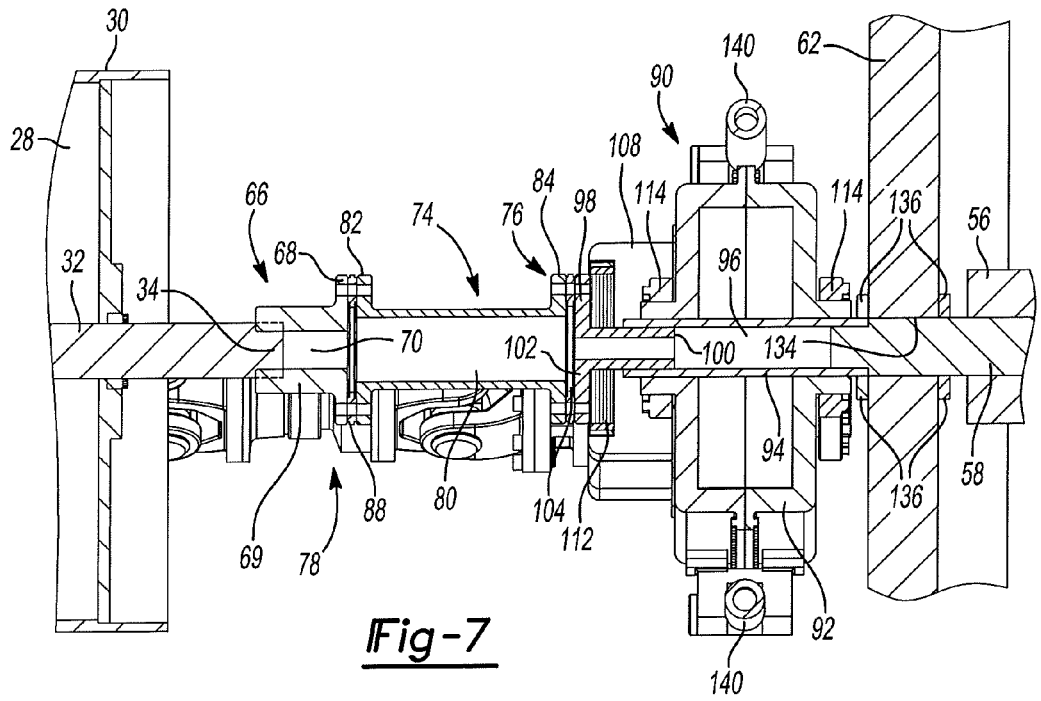
FIG. 7 is a cross-sectional view of a portion of the exemplary dual-purpose dynamometer assembly of FIG. 6 taken along line 7-7 of FIG. 6.

As best seen in FIGS. 3 and 7, a chassis dynamometer coupler 66 is disposed adjacent the chassis dynamometer axle 32 outboard of the chassis dynamometer bearing assembly 36. The chassis dynamometer coupler 66 includes a flange 68 and a shaft 69 defining a bore 70. The bore 70 of the chassis dynamometer coupler 66 mates with the coupling end 34 of the chassis dynamometer axle 32 to rotatably couple the chassis dynamometer coupler 66 with the chassis dynamometer axle 32. The flange 68 of the chassis dynamometer coupler 66 extends radially from and circumferentially about the chassis dynamometer coupler 66 and presents a plurality of holes circumferentially spaced about the shaft 69 of the flange 68 of the chassis dynamometer coupler 66. A chassis dynamometer jackshaft 74 is disposed adjacent the chassis dynamometer coupler 66. The chassis dynamometer jackshaft 74 extends between a proximal end 76 and a distal end 78. The chassis dynamometer jackshaft 74 includes a hollow interior 80, an input flange 82 at the distal end 78 of the chassis dynamometer jackshaft 74, and an output flange 84 at the proximal end 76 of the chassis dynamometer jackshaft 74.

The input flange 82 of the chassis dynamometer jackshaft 74 mates with the flange 68 of the chassis dynamometer coupler 66 to rotatably couple the chassis dynamometer jackshaft 74 with the chassis dynamometer axle 32. More specifically, the input flange 82 of the chassis dynamometer jackshaft 74 may have a plurality of holes spaced circumferentially about the input flange 82 of the chassis dynamometer jackshaft 74 that align with the plurality of holes in the flange 68 of the chassis dynamometer coupler 66. Fasteners (FIG. 6) such as bolts, pins, or studs extend through these holes to rotatably couple the flange 68 of the chassis dynamometer coupler 66 with the input flange 82 of the chassis dynamometer jackshaft 74. A first flex disc 88 (FIG. 7) may be disposed between the input flange 82 of the chassis dynamometer jackshaft 74 and the flange 68 of the chassis dynamometer coupler 66. The first flex disc 88 may be made of a compressible or elastic material such that the first flex disc 88 permits limited angular and axial movement of the chassis dynamometer axle 32 with respect to the chassis dynamometer jackshaft 74.

The dual-purpose dynamometer assembly 20a also includes a gearbox 90 disposed between and rotatably coupling the chassis dynamometer axle 32 and the powertrain dynamometer shaft 40 with the dynamometer motor 56. The gearbox 90 generally includes a housing 92. The housing 92 may be thermally insulated and filled with a lubricant or a fluid that has been thermally conditioned. It should be appreciated that the term "thermally conditioned" means that the lubricant or fluid contained within the housing 92 is heated or cooled to a predetermined temperature. This provides proper gearbox functionality where the gearbox 90 is subject to the extreme temperatures in the test chamber 60—hot or cold. It should also be appreciated that the term "filled" means that the gearbox 90 may contain a lubricant or fluid; however, the amount of lubricant or fluid contained within the gearbox 90 may vary and the term "filled" does not require the gearbox 90 to be filled completely with the thermally conditioned lubricant or fluid. The gearbox 90 may also include a plurality of gears, sprockets, or pulleys disposed within the housing 92 that rotatably couple the chassis dynamometer axle 32 and the powertrain dynamometer shaft 40 with the dynamometer motor 56. Where the gearbox 90 contains a plurality of gears 93 (FIGS. 6 and 8), the plurality of gears 93 are arranged in meshing engagement with one another to so as to transfer rotation of the powertrain dynamometer shaft 40 to the dynamometer motor 56. Where the gearbox 90 contains a plurality of sprockets (not shown), the plurality of sprockets may by interconnected by a chain (not shown) that transfers rotation of the powertrain dynamometer shaft 40 to the dynamometer motor 56. Finally, where the gearbox 90 contains a plurality of pulleys (not shown), the plurality of pulleys may by interconnected by a belt (not shown) that transfers rotation of the powertrain dynamometer shaft 40 to the dynamometer motor 56.

Figure 6:
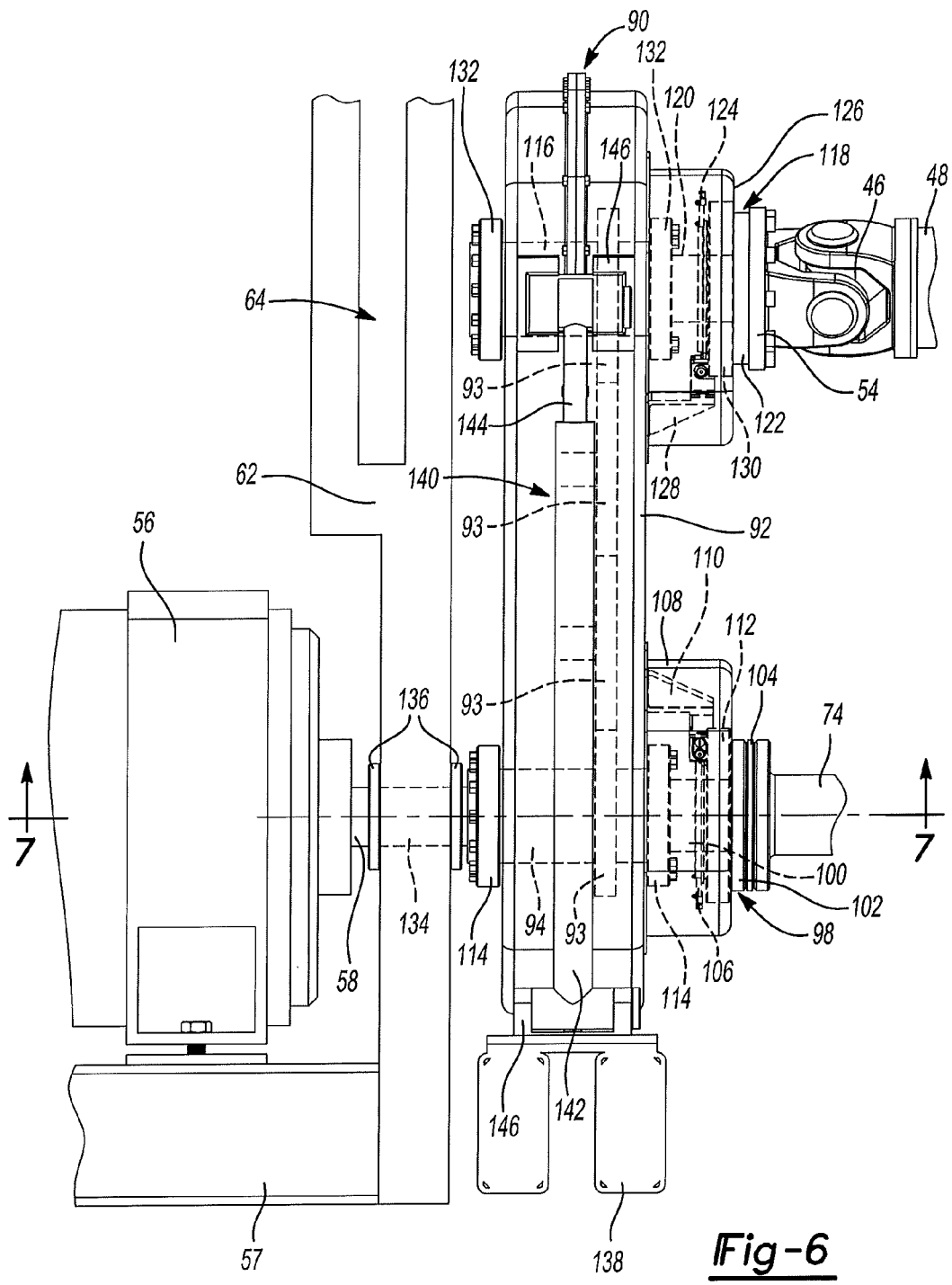
FIG. 6 is a side elevation view illustrating part of the exemplary dual-purpose dynamometer assembly shown in FIG. 3 where the first and second torque flanges can be seen looking through the first and second torque flange enclosures.

Referring to FIGS. 6 and 7, the gearbox 90 has a first gearbox shaft 94. The first gearbox shaft 94 may include a hollow center 96 that receives the motor shaft 58 of the dynamometer motor 56. The first gearbox shaft 94 extends linearly through the housing 92 of the gearbox 90 between the chassis dynamometer jackshaft 74 and the motor shaft 58 to rotatably couple the chassis dynamometer jackshaft 74 and the motor shaft 58. A first gearbox coupler 98 may be disposed between the chassis dynamometer jackshaft 74 and the first gearbox shaft 94. The first gearbox coupler 98 includes an annular portion 100 extending axially from the chassis dynamometer jackshaft 74 and into the hollow center 96 of the first gearbox shaft 94. The first gearbox coupler 98 also includes a flange 102 extending radially from and circumferentially about the annular portion 100 of the first gearbox coupler 98. The flange 102 of the first gearbox coupler 98 mates with the output flange 84 of the chassis dynamometer jackshaft 74 to rotatably couple the first gearbox coupler 98 with the chassis dynamometer jackshaft 74. Both the flange 102 of the first gearbox coupler 98 and the output flange 84 of the chassis dynamometer jackshaft 74 may have a plurality of holes that are circumferentially spaced and aligned with each other such that fasteners can be inserted into the holes to rotatably couple the flange 102 of the first gearbox coupler 98 with the output flange 84 of the chassis dynamometer jackshaft 74. A second flex disc 104 may be disposed between the output flange 84 of the chassis dynamometer jackshaft 74 and the flange 102 of the first gearbox coupler 98. The second flex disc 104 may be made of a compressible or elastic material such that the second flex disc 104 permits limited angular and axial movement of the chassis dynamometer jackshaft 74 with respect to the first gearbox shaft 94.

Referring to FIG. 6, the gearbox 90 may also include a first torque flange 106 and a first torque flange enclosure 108. The first torque flange 106 may have a disc-like shape and may circumscribe the annular portion 100 of the first gearbox coupler 98. The first torque flange enclosure 108 projects from the housing 92 of the gearbox 90 in a direction extending away from the chamber wall 62 to enclose the first torque flange 106 and portions of the first gearbox shaft 94 and the first gearbox coupler 98. It should be appreciated that the first torque flange enclosure 108 may be integral with the housing 92 of the gearbox 90 or alternatively the first torque flange enclosure 108 may be a separate piece or pieces that attaches to the housing 92 of the gearbox 90. The gearbox housing 92 may be filled with warm, dry air to isolate the first torque flange 106 from the extreme temperatures within the test chamber 60. A first torque flange mount 110 connects the first torque flange 106 to the housing 92 of the gearbox 90 such that the first torque flange 106 remains stationary with respect to the gearbox 90. It should be appreciated that the first torque flange mount 110 may be fixed to the housing 92 of the gearbox 90 or to the first torque flange enclosure 108. The first torque flange enclosure 108 defines an opening through which the annular portion 100 of the first gearbox coupler 98 extends. A first brush seal 112 is situated adjacent to or within the opening in the first torque flange enclosure 108 and is disposed axially between the first torque flange 106 and the first torque flange enclosure 108. The first brush seal 112 circumscribes the annular portion 100 of the first gearbox coupler 98 to seal off the first torque flange enclosure 108 from the test chamber 60 while permitting rotation of the first gearbox coupler 98. The first brush seal 112 may be made of a plurality of fibers or strands that generally extend radially inwardly into the opening in the first torque flange enclosure 108 to contact the annular portion 100 of the first gearbox coupler 98.

A first pair of shaft compression collars 114 may be disposed on opposite sides of the gearbox 90. The first pair of shaft compression collars 114 circumscribes the first gearbox shaft 94 to clamp the motor shaft 58 and the annular portion 100 of the first gearbox coupler 98 within the hollow center 96 of the first gearbox shaft 94. By constricting the first gearbox shaft 94, the first pair of shaft compression collars 114 reduces the diameter of the hollow center 96 of the first gearbox shaft 94 so as to rotatably couple the motor shaft 58 and the first gearbox coupler 98 with the first gearbox shaft 94.

Still referring to FIG. 6, the gearbox 90 has a second gearbox shaft 116. The second gearbox shaft 116 is spaced from the first gearbox shaft 94. By way of example and without limitation, the second gearbox shaft 116 maybe vertically spaced from the first gearbox shaft 94. The second gearbox shaft 116 extends linearly through the housing 92 of the gearbox 90 to align with the powertrain dynamometer shaft 40. Further, the second gearbox shaft 116 may include a hollow center 96. The second gearbox shaft 116 is rotatably coupled with the first gearbox shaft 94 through the plurality of gears, sprockets, or pulleys of the gearbox 90. A second gearbox coupler 118 may be disposed between the powertrain dynamometer shaft 40 and the second gearbox shaft 116. The second gearbox coupler 118 includes an annular portion 120 extending axially from the powertrain dynamometer shaft 40 and into the hollow center 96 of the second gearbox shaft 116 for coupling with the second gearbox shaft 116. The second gearbox coupler 118 further includes a flange 122 that extends radially from and circumferentially about the annular portion 120 of the second gearbox coupler 118. The flange 122 of the second gearbox coupler 118 mates with the output flange 54 of the powertrain dynamometer shaft 40 to rotatably couple the second gearbox coupler 118 with the powertrain dynamometer shaft 40. Both the flange 122 of the second gearbox coupler 118 and the output flange 54 of the powertrain dynamometer shaft 40 may have a plurality of holes that are circumferentially spaced and aligned with each other such that fasteners can be inserted into the holes to rotatably couple the flange 122 of the second gearbox coupler 118 with the output flange 54 of the powertrain dynamometer shaft 40.

The gearbox 90 may additionally include a second torque flange 124 and a second torque flange enclosure 126. The second torque flange 124 may generally have a disc-like shape and may circumscribe the annular portion 120 of the second gearbox coupler 118. The second torque flange enclosure 126 projects from the housing 92 of the gearbox 90 in a direction extending away from the chamber wall 62 to enclose the second torque flange 124 and portions of the second gearbox shaft 116. The gearbox housing 92 may be filled with warm, dry air to isolate the second torque flange 124 from the extreme temperatures within the test chamber 60. A second torque flange mount 128 connects the second torque flange 124 to the housing 92 of the gearbox 90 such that the second torque flange 124 remains stationary with respect to the gearbox 90. It should be appreciated that the second torque flange mount 128 may be fixed to the housing 92 of the gearbox 90 or to the second torque flange enclosure 126. The second torque flange enclosure 126 defines an opening through which the annular portion 120 of the second gearbox coupler 118 extends. A second brush seal 130 is situated adjacent to or within the opening in the second torque flange enclosure 126 and is disposed axially between the second torque flange 124 and the second torque flange enclosure 126. The second brush seal 130 circumscribes the annular portion 120 of the second gearbox coupler 118 to seal off the second torque flange enclosure 126 from the test chamber 60 while permitting rotation of the second gearbox coupler 118. The second brush seal 130 may also be made of a plurality of fibers or strands that generally extend radially inwardly into the opening in the second torque flange enclosure 126 to contact the annular portion 120 of the second gearbox coupler 118.

A second pair of shaft compression collars 132 may be disposed on opposite sides of the gearbox 90. The second pair of shaft compression collars 132 circumscribes the second gearbox shaft 116 to clamp the annular portion 120 of the second gearbox coupler 118 within the hollow center 96 of the second gearbox shaft 116. By constricting the second gearbox shaft 116, the second pair of shaft compression collars 132 reduces the diameter of the hollow center 96 of the second gearbox shaft 116 so as to rotatably couple the second gearbox coupler 118 with the first gearbox shaft 94.

As best seen in FIGS. 1-6, the chamber wall 62 of the test chamber 60 is disposed between the dynamometer motor 56 and the gearbox 90 such that the dynamometer motor 56 is disposed outside of the test chamber 60. Accordingly, the dynamometer motor 56 is isolated from extreme temperatures within the test chamber 60. This is advantageous because the extreme temperatures degrade the performance of the dynamometer motor 56 and, in extreme cases, can damage the dynamometer motor 56. With the dynamometer motor 56 located outside the test chamber 60, the dynamometer motor 56 need not include its own insulation or thermal conditioning to operate. Also, by placing the dynamometer motor 56 outside the test chamber 60, the size of the test chamber 60—mainly its width—can be reduced. This is advantageous because less energy is consumed to maintain the extreme temperatures within the test chamber 60 when the test chamber 60 is smaller. In the arrangement shown in FIGS. 1-8, the gearbox 90 is disposed within the test chamber 60. As noted above, the housing 92 of the gearbox 90 may be insulated and may contain warm, dry air to withstand the extreme temperatures within the test chamber 60.

As best seen in FIGS. 6-7, a motor shaft aperture 134 penetrates the at least one chamber wall 62. The motor shaft aperture 134 receives the motor shaft 58 such that the dynamometer motor 56 is connected to the gearbox 90 through the motor shaft aperture 134. Accordingly, only a single penetration in the chamber wall 62 is needed to connect the dynamometer motor 56 to the gearbox 90. This is advantageous because heat can be transferred through penetrations in the chamber wall 62 such that more energy is required to maintain the test chamber 60 at extreme temperatures during testing. To reduce heat transfer through the motor shaft aperture 134, a pair of rotary shaft seals 136 may be disposed on opposite sides of the chamber wall 62 adjacent the motor shaft aperture 134. The pair of rotary shaft seals 136 circumscribes the motor shaft 58 to seal off the dynamometer motor 56 from the test chamber 60.

Figure 4:
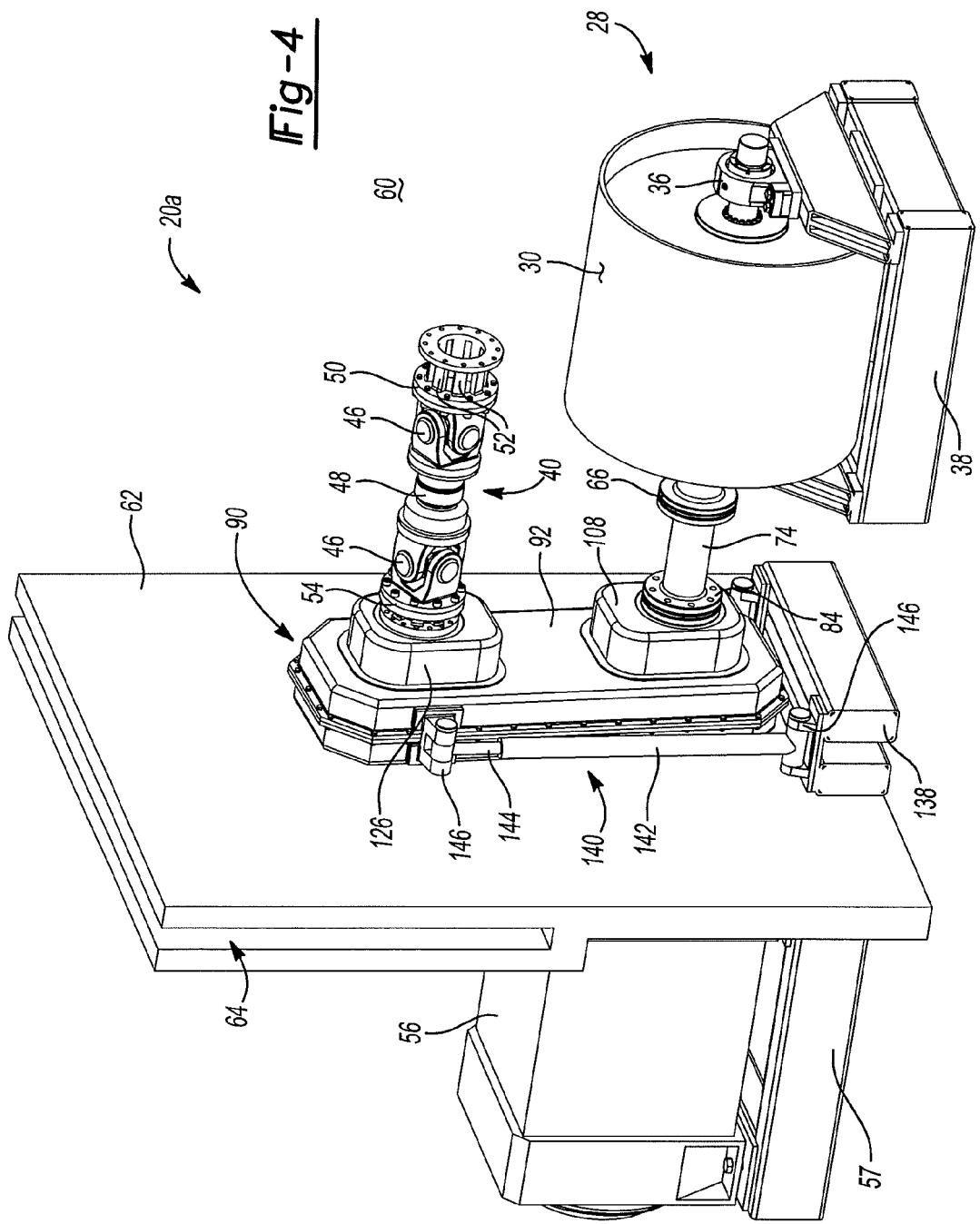
FIG. 4 is a side perspective view of the exemplary dual-purpose dynamometer assembly shown in FIG. 3.
Figure 5:
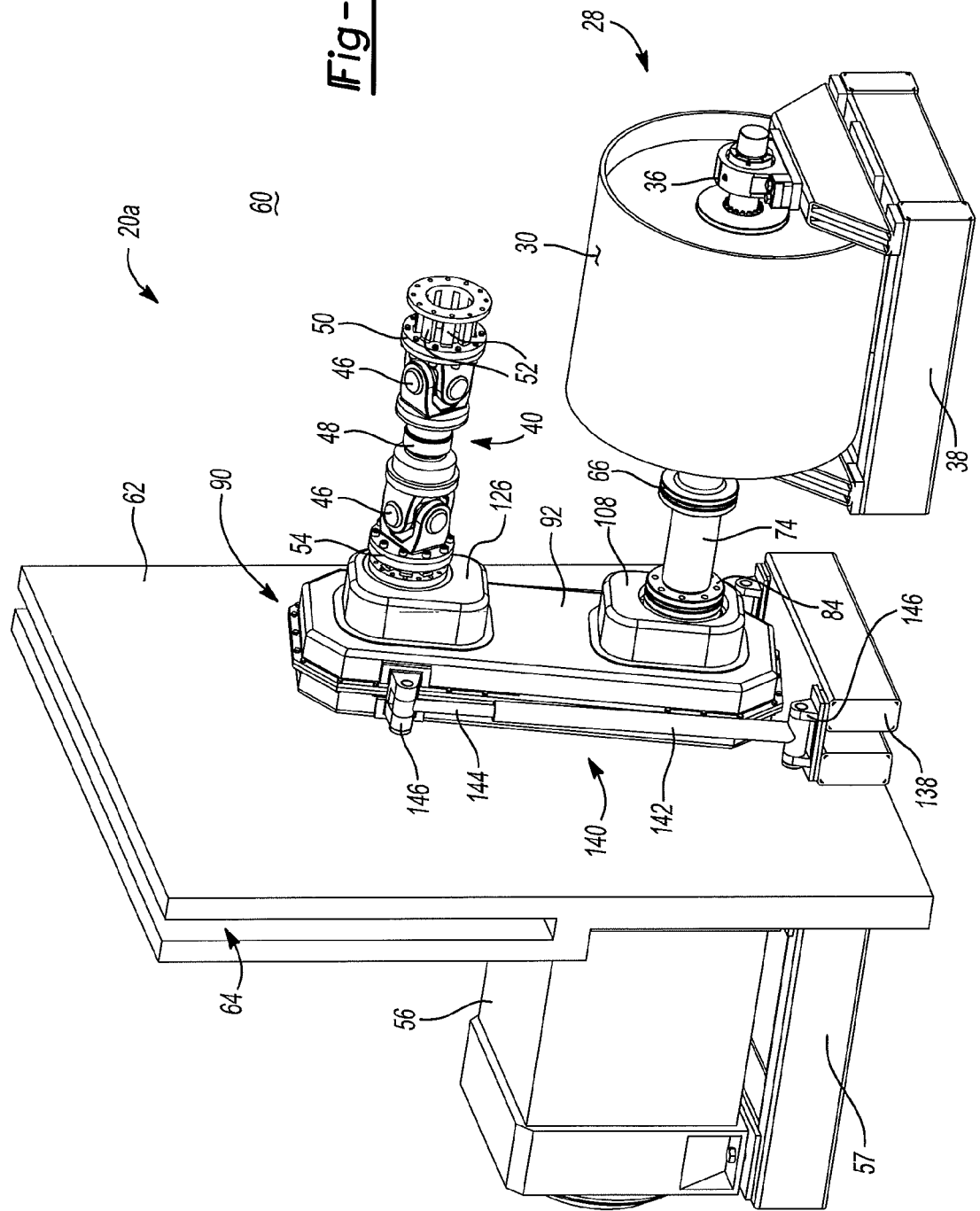
FIG. 5 is a side perspective view of the exemplary dual-purpose dynamometer assembly shown in FIG. 4 where the gearbox has been pivoted relative to the view shown in FIG. 4 to accommodate a vehicle having a different wheelbase.
Figure 8:
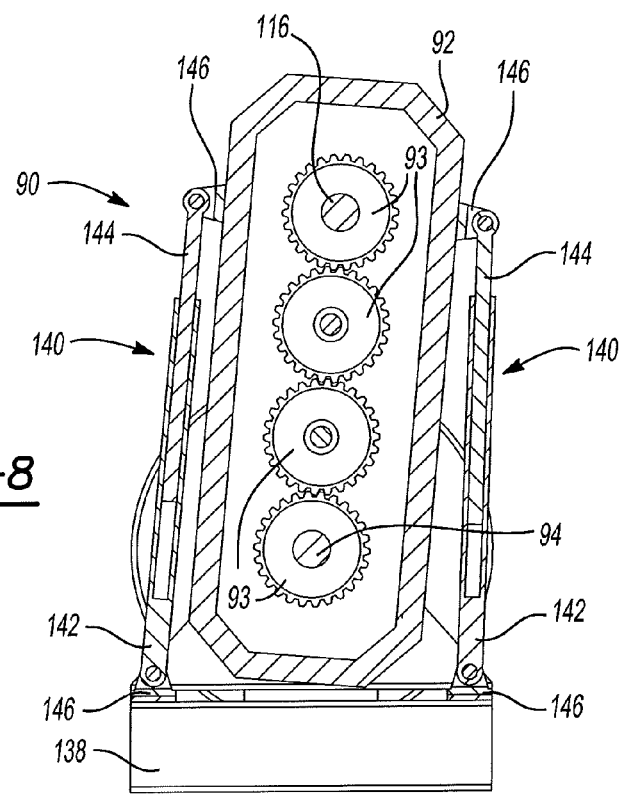
FIG. 8 is a front cross-sectional view of the gearbox of the exemplary dual-purpose dynamometer assembly of FIG. 3 taken along line 8-8 of FIG. 3.

Still referring to FIGS. 1-8, the gearbox 90 may be mounted to a gearbox frame 138. The gearbox frame 138 generally supports the gearbox 90 within the test chamber 60. While various configurations are possible, the gearbox 90 may be spaced from the gearbox frame 138. By way of example and without limitation, the gearbox 90 may be vertically spaced from the gearbox frame 138. A pair of gearbox pivot actuators 140 are disposed on opposite sides of the gearbox 90. The pair of gearbox pivot actuators 140 are connected to the housing 92 of the gearbox 90 at one end and to the gearbox frame 138 at the other end. The pair of gearbox pivot actuators 140 may each include a barrel 142 and a piston 144 that moves linearly with respect to the barrel 142. Alternatively, it should be appreciated that other styles of gearbox pivot actuators 140 may be used, including without limitation, gearbox pivot actuators 140 that have lead screws, ball screws, or pneumatics (none shown). A pair of brackets 146 are disposed on opposite sides of the gearbox 90 housing 92 and the gearbox frame 138. The pair of brackets 146 couple the pair of gearbox pivot actuators 140 to the housing 92 of the gearbox 90 and the gearbox frame 138. As best seen in FIGS. 4, 5, and 8, movement of the pair of gearbox pivot actuators 140 pivots the gearbox 90 about the motor shaft 58 such that the powertrain dynamometer shaft 40 can be aligned with the powertrain components 26 of vehicles 22 with different wheelbases. This is advantageous because the disclosed dual-purpose dynamometer assembly 20*a* can be easily adjusted to test a wide variety of vehicles 22 regardless of the vehicle's wheelbase.

Now referring to FIGS. 9-14, another configuration of the dual-purpose dynamometer assembly 20*b* is illustrated. In accordance with this configuration, the gearbox 90 of the dual-purpose dynamometer assembly 20*b* is disposed outside the test chamber 60 such that both the gearbox 90 and the dynamometer motor 56 are not subject to the extreme temperature of the test chamber 60. Accordingly, the housing 92 of the gearbox 90 does not require insulation or a temperature-conditioned lubricant or fluid in this configuration. Instead, the housing 92 may simply be filled with a non-temperature conditioned lubricant or fluid. Further, the first torque flange enclosure 108 and the second torque flange enclosure 126 may be eliminated because the first torque flange 106 and the second torque flange 124 are isolated from the extreme temperatures of the test chamber 60 by the chamber wall 62. In accordance with this configuration, with the gearbox 90 being disposed outside the test chamber 60, adjustment of the powertrain dynamometer shaft 40 and the chassis dynamometer roll 28 to accommodate vehicles with different wheelbases is achieved by sliding the dynamometer motor 56, the gearbox 90, and the chassis dynamometer roll 28 with respect to the chamber wall 62.

Figure 13:
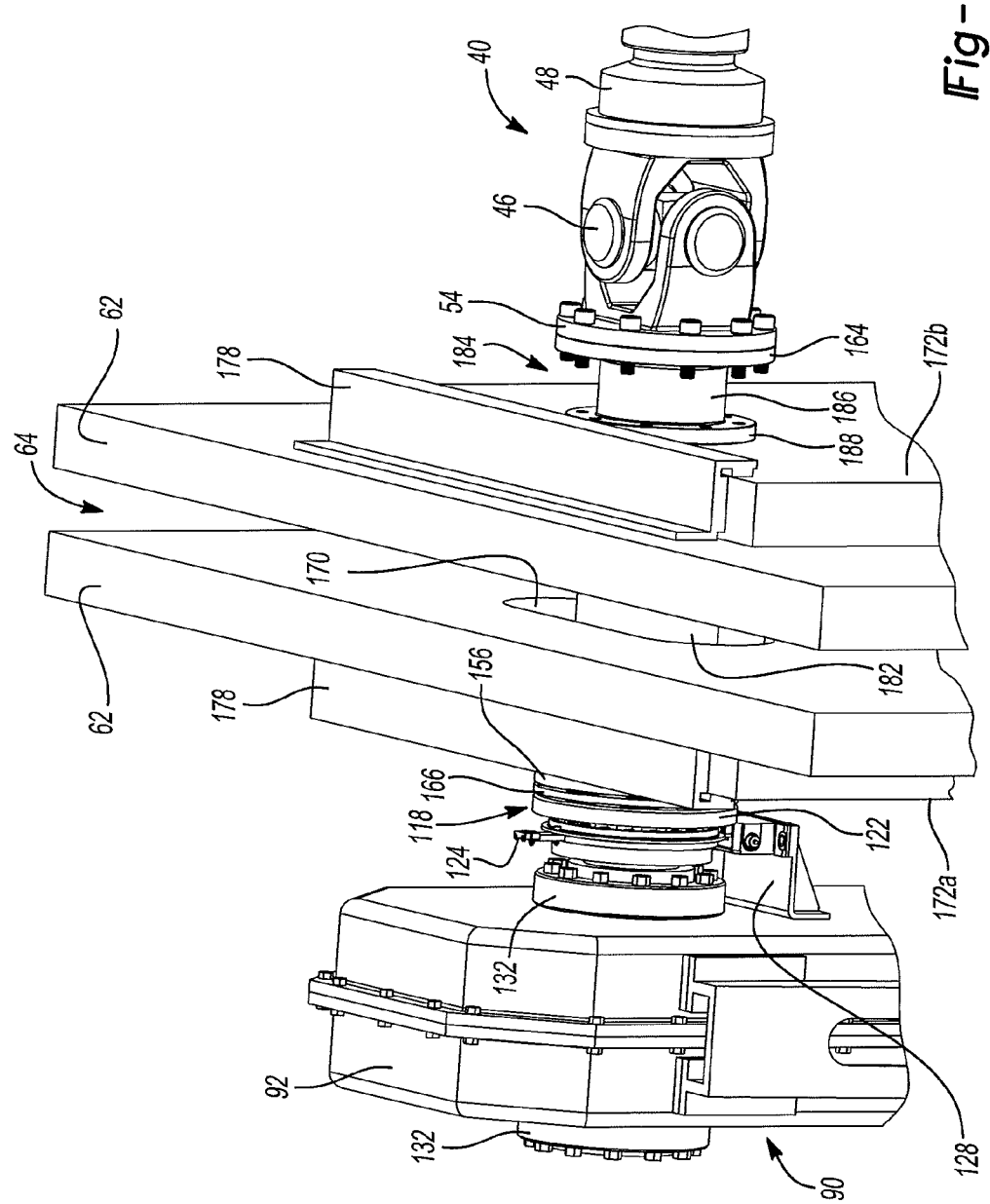
FIG. 13 is a partial, side perspective view of the exemplary dual-purpose dynamometer assembly shown in FIG. 10 where portions of the gearbox, chamber wall, sliding door seals, powertrain dynamometer jackshaft, wall mount bearing assembly and powertrain dynamometer shaft are illustrated.

As best seen in FIGS. 11-13, the dual-purpose dynamometer assembly 20 may further include a powertrain dynamometer jackshaft 148 disposed between the powertrain dynamometer shaft 40 and the second gearbox coupler 118. The powertrain dynamometer jackshaft 148 may generally extend between a proximal end 150 and a distal end 152 and may present a hollow interior 153. The powertrain dynamometer jackshaft 148 may also have a splined hub 154 at the distal end 152 and an output flange 156 at the proximal end 150.

A powertrain dynamometer coupler 158 may be disposed between the powertrain dynamometer shaft 40 and the distal end 152 of the powertrain dynamometer jackshaft 148. The powertrain dynamometer coupler 158 includes an annular portion 160 extending axially from powertrain dynamometer shaft 40 and toward the gearbox 90. The annular portion 160 of the powertrain dynamometer coupler 158 presents a bore 162 that receives the splined hub 154 of the powertrain dynamometer jackshaft 148 to rotatably couple the powertrain dynamometer coupler 158 with the powertrain dynamometer jackshaft 148. The powertrain dynamometer coupler 158 further includes a flange 164 extending radially from and circumferentially about the annular portion 160 of the powertrain dynamometer coupler 158. The flange 164 of the powertrain dynamometer coupler 158 mates with the output flange 54 of the powertrain dynamometer shaft 40 to rotatably couple the powertrain dynamometer coupler 158 with the powertrain dynamometer shaft 40. More particularly, both the flange 164 of the powertrain dynamometer coupler 158 and the output flange 54 of the powertrain dynamometer shaft 40 may have a plurality of holes that are circumferentially spaced and aligned with each other such that fasteners can be inserted into the holes to rotatably couple the flange 164 of the powertrain dynamometer coupler 158 with the output flange 54 of the powertrain dynamometer shaft 40.

As best shown in FIG. 11, the second gearbox coupler 118 in this configuration is disposed between the proximal end 150 of the powertrain dynamometer jackshaft 148 and the second gearbox shaft 116. Accordingly, the annular portion 120 of the second gearbox coupler 118 extends axially from the proximal end 150 of the powertrain dynamometer jackshaft 148 and into the hollow center 96 of the second gearbox shaft 116 for coupling with the second gearbox shaft 116. The flange 122 of the second gearbox coupler 118 mates with the output flange 156 of the powertrain dynamometer jackshaft 148 to rotatably couple the second gearbox coupler 118 with the powertrain dynamometer jackshaft 148. Both the flange 122 of the second gearbox coupler 118 and the output flange 156 of the powertrain dynamometer jackshaft 148 may have a plurality of holes that are circumferentially spaced and aligned with each other such that fasteners can be inserted into the holes to rotatably couple the flange 122 of the second gearbox coupler 118 with the output flange 156 of the powertrain dynamometer jackshaft 148.

As best seen in FIGS. 11 and 12, a third flex disc 166 may be disposed between the output flange 84 of the chassis dynamometer jackshaft 74 and the flange 122 of the second gearbox coupler 118. The third flex disc 166 may be made of a compressible or elastic material such that the third flex disc 166 permits limited angular and axial movement of the powertrain dynamometer jackshaft 148 with respect to the second gearbox coupler 118.

In accordance with this configuration, the chamber wall 62 of the test chamber 60 is disposed between the gearbox 90 on one side and the chassis dynamometer axle 32 and the powertrain dynamometer shaft 40 on the other side such that the dynamometer motor 56 and the gearbox 90 are disposed outside of the test chamber 60 and are isolated from the extreme temperatures of the test chamber 60. One or more apertures 168, 170 penetrate the chamber wall 62. The chassis dynamometer jackshaft 74 and the powertrain dynamometer jackshaft 148 extend through the apertures 168, 170. To reduce the size of the penetration or penetrations in the chamber wall 62, the apertures 168, 170 may include a first aperture 168 (FIG. 9) and a second aperture 170 (FIG. 13) that is spaced from the first aperture 168.

Figure 9:
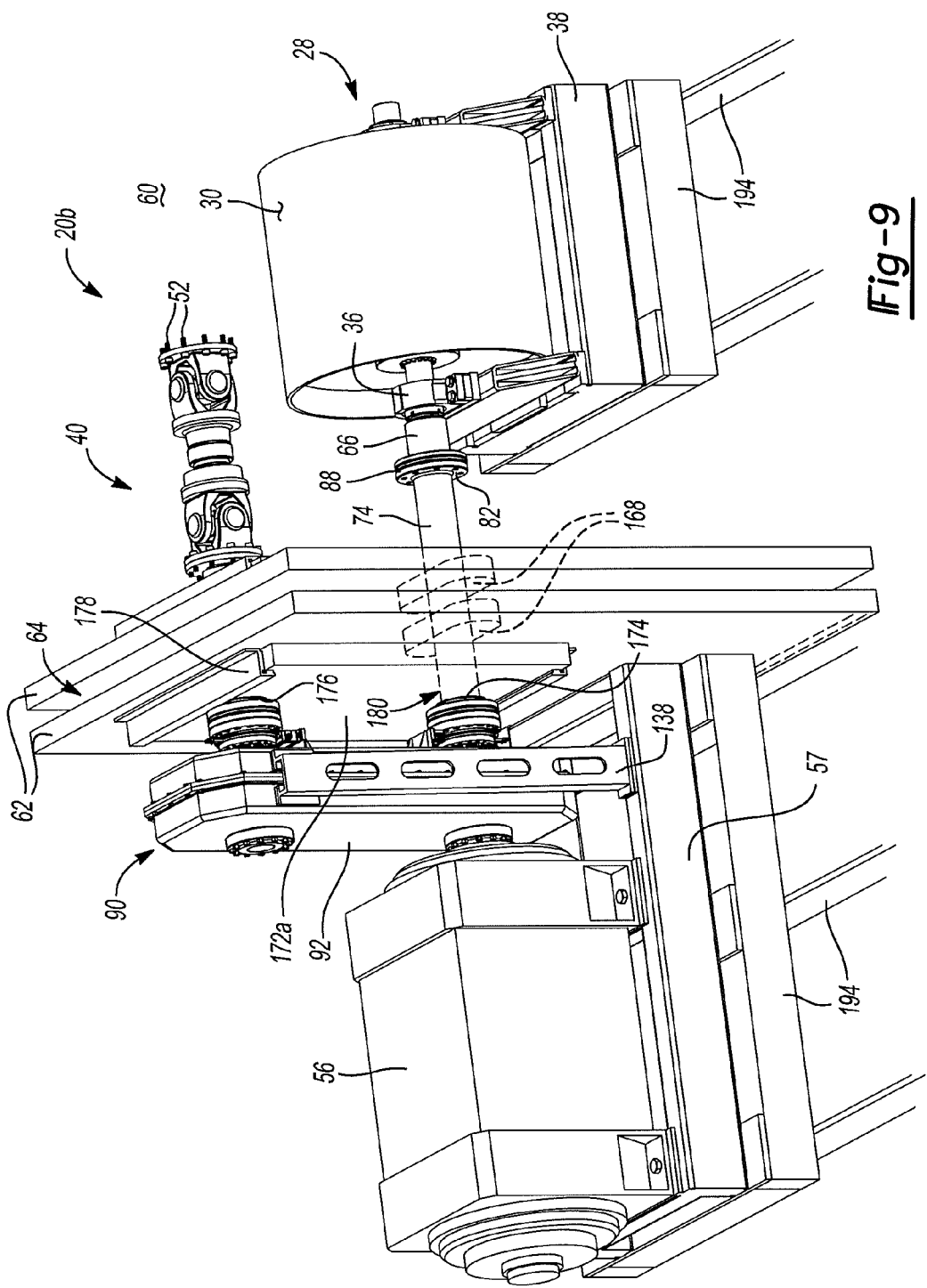
FIG. 9 is a side perspective view of another exemplary dual-purpose dynamometer assembly where a dynamometer motor, gearbox, and chassis dynamometer are disposed on one or more sliding tracks.

As best seen in FIG. 9, the first aperture 168 receives the chassis dynamometer jackshaft 74 such that the chassis dynamometer jackshaft 74 is connected to the gearbox 90 through the first aperture 168. The first aperture 168 may generally have a linear slot-like shape that may be arranged substantially horizontal such that the chassis dynamometer jackshaft 74 can slide horizontally within the first aperture 168. As best seen in FIG. 13, the second aperture 170 receives the powertrain dynamometer jackshaft 148 such that the powertrain dynamometer jackshaft 148 is connected to the gearbox 90 through the second aperture 170. The second aperture 170 may be vertically spaced from the first aperture 168. The second aperture 170 may also have a linear slot-like shape that may be arranged substantially horizontal such that the powertrain dynamometer jackshaft 148 can slide horizontally within the second aperture 170.

Figure 10:
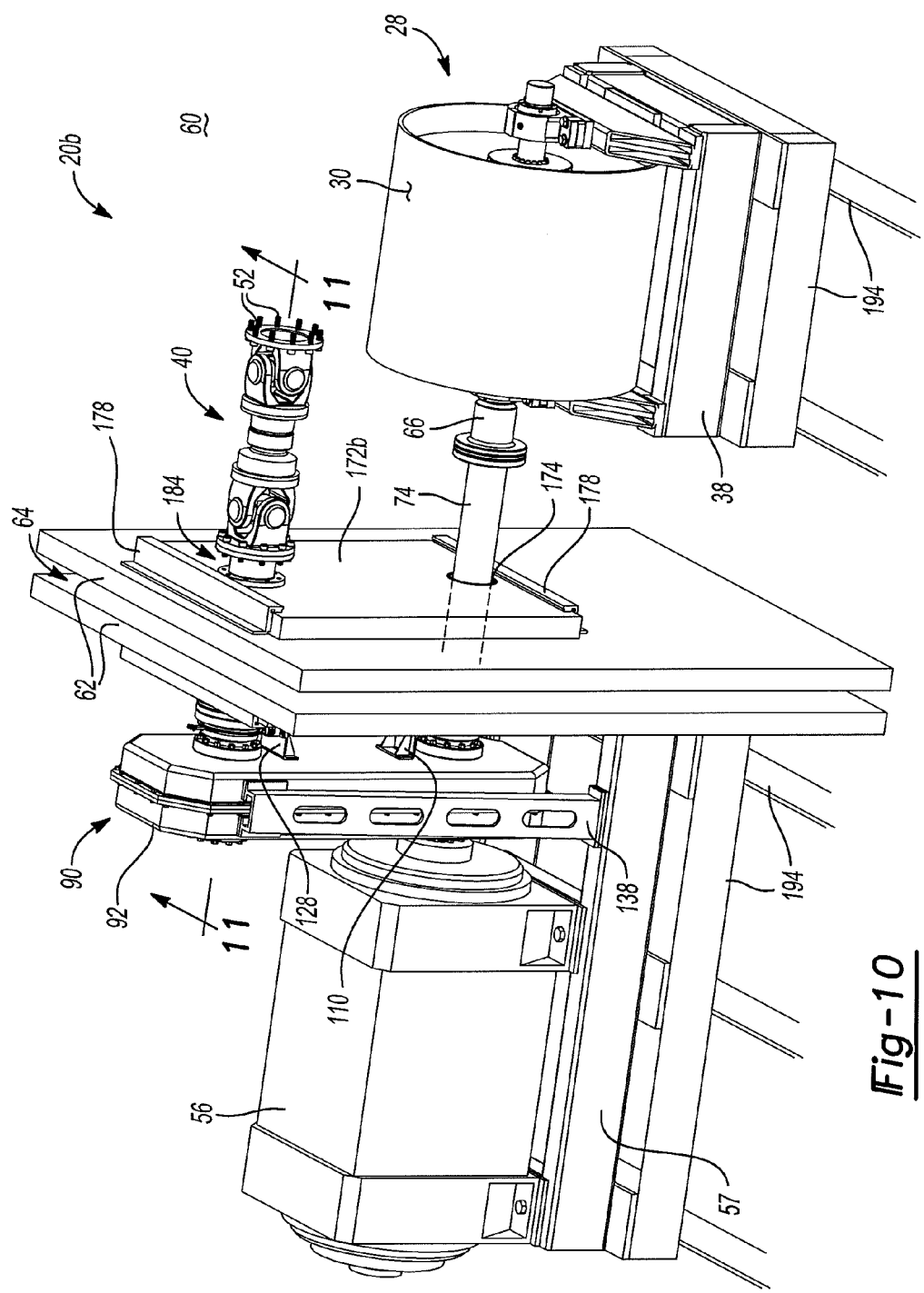
FIG. 10 is another side perspective view of the exemplary dual-purpose dynamometer assembly shown in FIG. 9.

One or more sliding door seals 172a, 172b are disposed adjacent the chamber wall 62 to cover the apertures 168, 170. Referring to FIGS. 9 and 10, the sliding door seals 172a, 172b are a pair of sliding door seals 172a, 172b disposed on opposite sides of the chamber wall 62. While the pair of sliding door seals 172a, 172b may have a variety of different shapes, by way of example and without limitation, each of the sliding door seals 172a, 172b may generally have a rectangular shape. The pair of sliding door seals 172a, 172b cover the first aperture 168 and the second aperture 170 to reduce heat transfer through the apertures 168, 170 in the chamber wall 62. Each sliding door seal 172a, 172b of the pair of sliding door seals 172a, 172b includes a first hole 174 (FIG. 10) that is aligned with the first aperture 168 in the chamber wall 62 and a second hole 176 (FIG. 9) that is aligned with the second aperture 170 in the chamber wall 62. The first hole 174 of each sliding door seal 172a, 172b receives the chassis dynamometer jackshaft 74 and the second hole 176 of each sliding door seal 172a, 172b receives the powertrain dynamometer jackshaft 148. A plurality of sliding door support brackets 178 are mounted on opposite sides of the chamber wall 62. The plurality of sliding door support brackets 178 are disposed above and below each sliding door seal 172a, 172b of the pair of sliding door seals 172a, 172b and support the pair of sliding door seals 172a, 172b on the chamber wall 62. It should be appreciated that the plurality of sliding door support brackets 178 hold the pair of sliding door seals 172a, 172b against the chamber wall 62 while permitting horizontal movement of the pair of sliding door seals 172a, 172b in response to horizontal movement of the chassis dynamometer jackshaft 74 and the powertrain dynamometer jackshaft 148.

With reference to FIGS. 9-12, a first rotary shaft seal 180 may be disposed within the first aperture 168 of the chamber wall 62, between the pair of sliding door seals 172a, 172b. The first rotary shaft seal 180 circumscribes the chassis dynamometer jackshaft 74 to seal off the dynamometer motor 56 and the gearbox 90 from the test chamber 60. As best seen in FIGS. 11 and 12, a second rotary shaft seal 182 may be disposed within or proximate to the second aperture 170 of the chamber wall 62, between the pair of sliding door seals 172a, 172b. The second rotary shaft seal 182 circumscribes the powertrain dynamometer jackshaft 148 to seal off the dynamometer motor 56 and the gearbox 90 from the test chamber 60.

As best seen in FIGS. 10-13, a wall mount bearing assembly 184 may be disposed between one of the sliding door seals 172b and the powertrain dynamometer coupler 158. The wall mount bearing assembly 184 supports the powertrain dynamometer shaft 40 while permitting free rotation thereof. More particularly, the wall mount bearing assembly 184 may include an annular portion 186 extending circumferentially about the annular portion 160 of the powertrain dynamometer coupler 158. The wall mount bearing assembly 184 may also have a flange 188 extending radially from and circumferentially about the annular portion 186 of the wall mount bearing assembly 184. The flange 188 of the wall mount bearing assembly 184 presents a plurality of holes that are spaced circumferentially about the flange 188. The wall mount bearing assembly 184 is mounted to one of the sliding door seals 172b by fasteners that extend through these holes. As shown in FIGS. 11 and 12, the wall mount bearing assembly 184 also includes an inboard bearing 190 and an outboard bearing 192. The inboard bearing 190 is disposed between the annular portion 186 of the wall mount bearing assembly 184 and the powertrain dynamometer coupler 158. The outboard bearing 192 is disposed between the flange 188 of the wall mount bearing assembly 184 and the distal end 152 of the powertrain dynamometer jackshaft 148.

Figure 14:
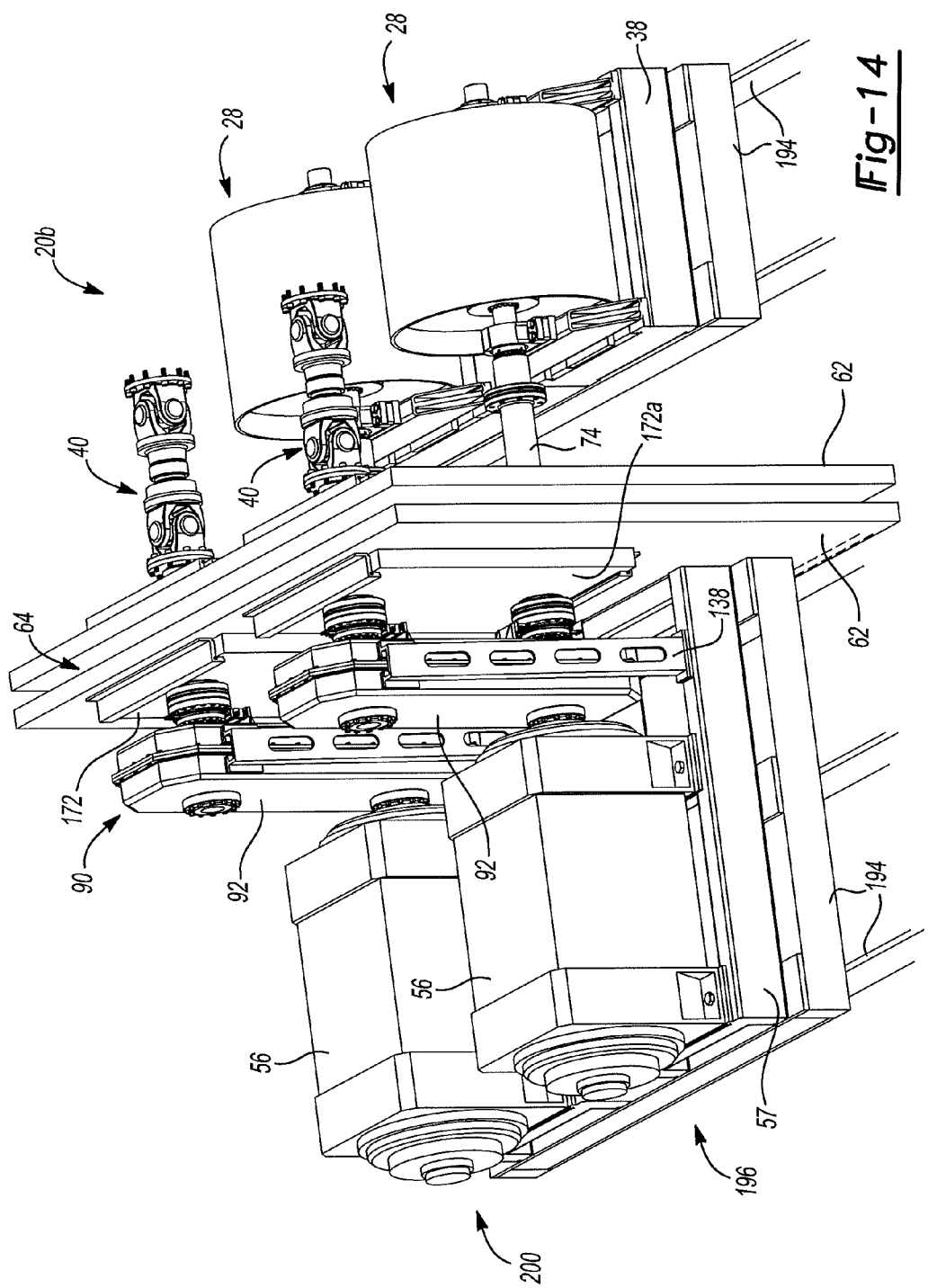
FIG. 14 is a side perspective view where two of the exemplary dual-purpose dynamometer assemblies shown in FIG. 9 are arranged along the chamber wall.

Referring to FIGS. 9, 10 and 14, the gearbox frame 138 in this configuration rigidly supports the gearbox 90 outside the test chamber 60. Further, the gearbox frame 138 is rigidly connected to the dynamometer motor frame 57 such that the gearbox 90 and the dynamometer motor 56 move together as one unit. The dynamometer motor frame 57 and the chassis dynamometer frame 38 are mounted on one or more sliding tracks 194. The sliding tracks 194 permit horizontal movement of the dynamometer motor 56, the gearbox 90 and the chassis dynamometer roll 28 with respect to the chamber wall 62 such that the powertrain dynamometer shaft 40 can be aligned with the powertrain components 26 of vehicles with different wheelbases or the chassis dynamometer roll 28 can be aligned with the wheels 24 of vehicles with different wheelbases.

Figure 15:
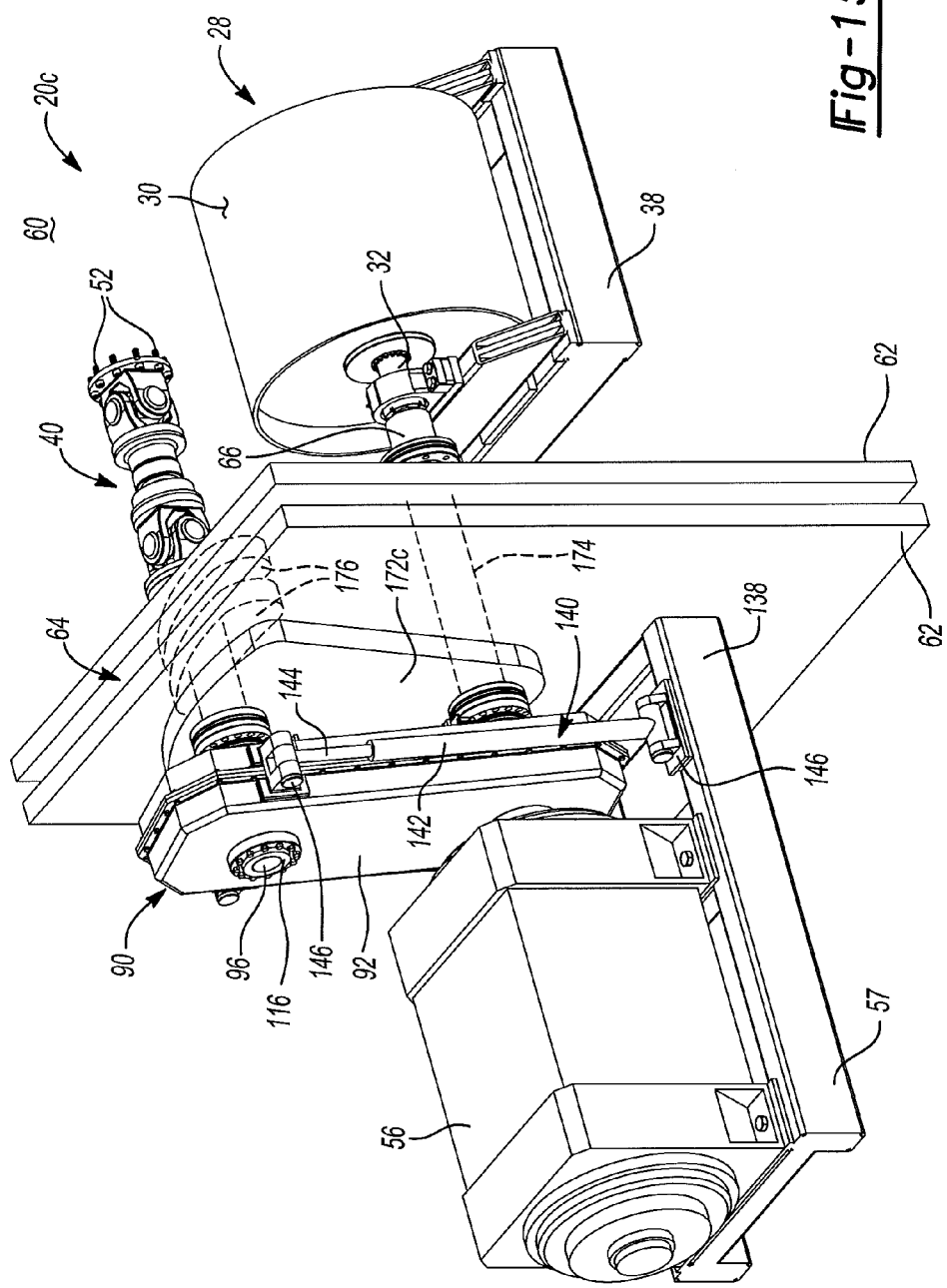
FIG. 15 is a side perspective view of another exemplary dual-purpose dynamometer assembly where the dynamometer motor, gearbox, and gearbox pivot actuators are disposed outside the test chamber.
Figure 16:
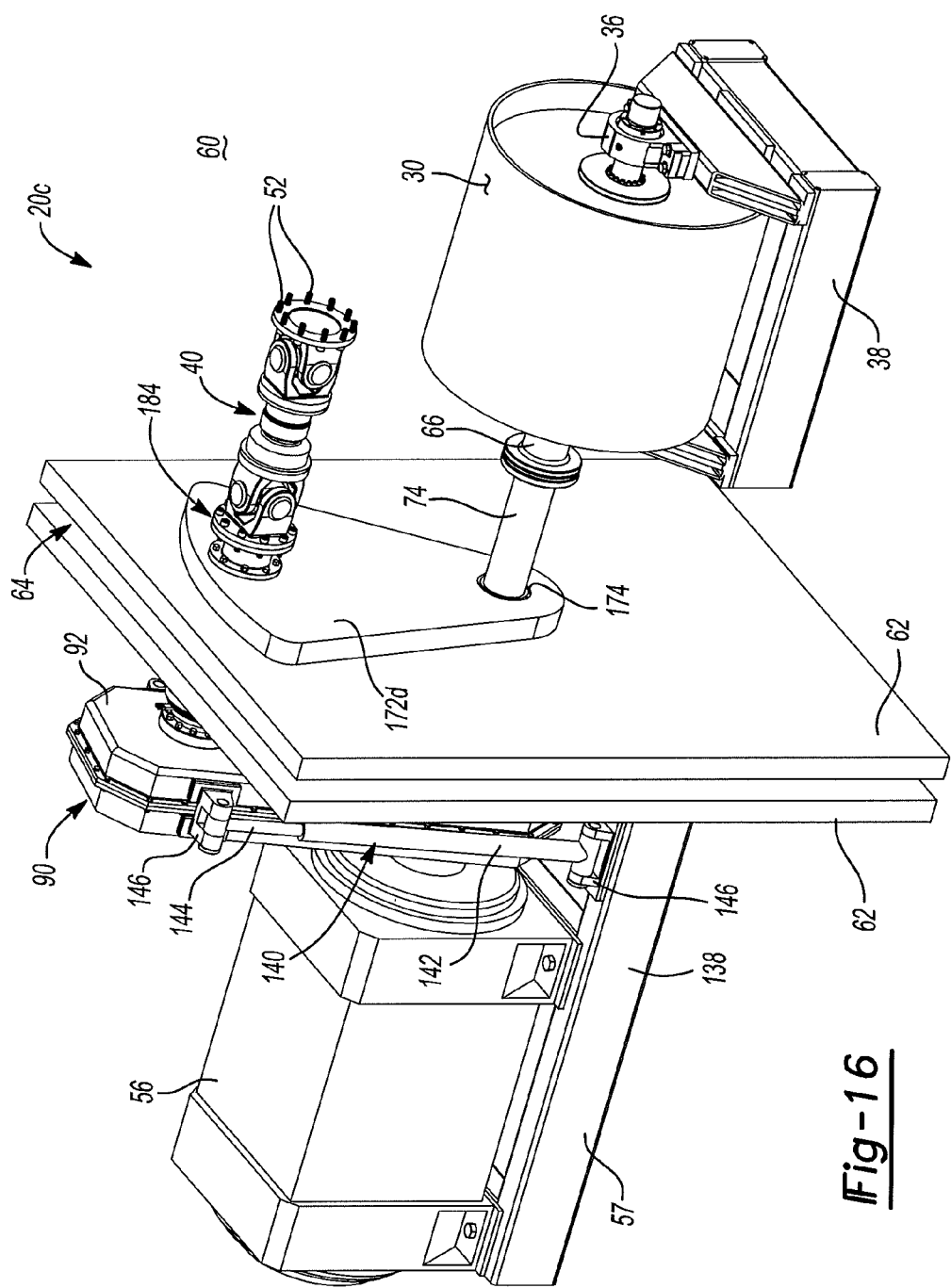
FIG. 16 is another side perspective view of the exemplary dual-purpose dynamometer assembly shown in FIG. 15.

FIGS. 15-16 illustrate yet another configuration of the dual-purpose dynamometer assembly 20c. In accordance with this configuration, the gearbox 90 of the dual-purpose dynamometer assembly 20c is disposed outside the test chamber 60 such that both the gearbox 90 and the dynamometer motor 56 are not subject to the extreme temperatures of the test chamber 60. Accordingly, the housing 92 of the gearbox 90 does not require insulation or temperature-conditioned lubricant in this configuration. Instead, the housing 92 may simply be filled with a non-temperature controlled lubricant or fluid. Further, the first torque flange enclosure 108 and the second torque flange enclosure 126 may be eliminated, as the first torque flange 106 and the second torque flange 124 are isolated from the extreme temperatures of the test chamber 60 by the chamber wall 62.

With the gearbox 90 being disposed outside the test chamber 60, adjustment of the powertrain dynamometer shaft 40 to accommodate vehicles with different wheel bases is achieved by pivoting the gearbox 90 with respect to the motor shaft 58 of the dynamometer motor 56. In this way, the gearbox 90 illustrated in FIGS. 15-16 pivots in the same manner as the gearbox 90 shown in FIGS. 1-8; however, in the configuration shown in FIGS. 15-16, the gearbox 90 is disposed outside the test chamber 60.

In accordance with this configuration, the chamber wall 62 of the test chamber 60 is disposed between the gearbox 90 on one side and the chassis dynamometer axle 32 and the powertrain dynamometer shaft 40 on the other side such that the dynamometer motor 56 and the gearbox 90 are disposed outside of the test chamber 60 and are isolated from the extreme temperatures of the test chamber 60. Again, one or more apertures 168, 170 penetrates the chamber wall 62. The chassis dynamometer jackshaft 74 and the powertrain dynamometer jackshaft 148 extend through the at least one aperture 168, 170. The first aperture 168 receives the chassis dynamometer jackshaft 74 such that the chassis dynamometer jackshaft 74 is connected to the gearbox 90 through the first aperture 168. Accordingly, the first aperture 168 may have a generally circular shape. By contrast, the second aperture 170 may have an arcuate slot-like shape and receives the powertrain dynamometer jackshaft 148 such that the powertrain dynamometer jackshaft 148 is connected to the gearbox 90 through the second aperture 170. Accordingly, the powertrain dynamometer jackshaft 148 can slide in an arc-like motion within the second aperture 170 as the gearbox 90 pivots about the motor shaft 58. As shown in FIGS. 15 and 16, the second aperture 170 may be vertically spaced from the first aperture 168.

One or more sliding door seals 172c, 172d are disposed adjacent the chamber wall 62 to cover the apertures 168, 170. In FIGS. 15 and 16, the one or more sliding door seals 172c, 172d are a pair of sliding door seals 172c, 172d that are disposed on opposite sides of the chamber wall 62. While the pair of sliding door seals 172c, 172d may have a variety of different shapes, by way of example and without limitation, each of the sliding door seals 172c, 172d may generally have a generally triangular shape. The pair of sliding door seals 172c, 172d cover the first aperture 168 and the second aperture 170 to reduce heat transfer through the apertures 168, 170 in the chamber wall 62. Each of the sliding door seals 172c, 172d includes a first hole 174 that is aligned with the first aperture 168 in the chamber wall 62 and a second hole 176 that is aligned with the second aperture 170 in the chamber wall 62. The first hole 174 of each of the sliding door seals 172c, 172d receives the chassis dynamometer jackshaft 74 and the second hole 176 of each of the sliding door seals 172c, 172d receives the powertrain dynamometer jackshaft 148.

The first rotary shaft seal 180 may be disposed within the first aperture 168 of the chamber wall 62, between the pair of sliding door seals 172c, 172d. The first rotary shaft seal 180 circumscribes the chassis dynamometer jackshaft 74 to seal off the dynamometer motor 56 and the gearbox 90 from the test chamber 60. The second rotary shaft seal 182 may be disposed within the second aperture 170 of the chamber wall 62, between the pair of sliding door seals 172c, 172d. The second rotary shaft seal 182 circumscribes the powertrain dynamometer jackshaft 148 to help seal off the dynamometer motor 56 and the gearbox 90 from the test chamber 60. The wall mount bearing assembly 184 may be disposed between one of the sliding door seals 172d and the powertrain dynamometer coupler 158. The wall mount bearing assembly 184 supports the powertrain dynamometer shaft 40 while permitting free rotation thereof. The annular portion 186 of the wall mount bearing assembly 184 extends circumferentially about the annular portion 160 of the powertrain dynamometer coupler 158. The flange 188 of the wall mount bearing assembly 184 extends radially from and circumferentially about the annular portion 186 of the wall mount bearing assembly 184. The flange 188 of the wall mount bearing assembly 184 presents a plurality of holes that are spaced circumferentially about the flange 188. The wall mount bearing assembly 184 is mounted to one of the sliding door seals 172d by fasteners that extend through these holes. The inboard bearing 190 of the wall mount bearing assembly 184 is disposed between the annular portion 186 of the wall mount bearing assembly 184 and the powertrain dynamometer coupler 158. The outboard bearing 192 of the wall mount bearing assembly 184 is disposed between the flange 188 of the wall mount bearing assembly 184 and the distal end 152 of the powertrain dynamometer jackshaft 148.

Still referring to FIGS. 15 and 16, the gearbox 90 is supported on a gearbox frame 138 outside the test chamber 60. The gearbox 90 may be vertically spaced from the gearbox frame 138 and the gearbox frame 138 may be connected to or be part of the dynamometer motor frame 57. It should be appreciated that the gearbox frame 138 may be separate from or integral with the dynamometer motor frame 57. Both variations are envisioned and are considered to be within the scope of the present disclosure. A pair of gearbox pivot actuators 140 are disposed on opposite sides of the gearbox 90. The pair of gearbox pivot actuators 140 are connected to the housing 92 of the gearbox 90 and to the gearbox frame 138 so as to support the gearbox 90 on the gearbox frame 138. A pair of brackets 146 are disposed on opposite sides of the gearbox housing 92 and the gearbox frame 138 to couple the pair of gearbox pivot actuators 140 to the housing 92 of the gearbox 90 and the gearbox frame 138. Each of the gearbox pivot actuators 140 includes barrel 142 and piston 144. The piston 144 moves linearly with respect to the barrel 142 to pivot the gearbox 90 about the motor shaft 58. By pivoting the gearbox 90 about the motor shaft 58 of the dynamometer motor 56, the powertrain dynamometer shaft 40 can be aligned with the powertrain components 26 of vehicles with different wheelbases.

With reference to FIGS. 1, 2 and 14, any of the dual-purpose dynamometer assemblies 20 disclosed herein may be replicated to accommodate vehicles having multiple wheels 24 and/or powertrain components 26. For example, any of the dual-purpose dynamometer assemblies 20 described herein may be designated as a first dual-purpose dynamometer assembly 196. All elements of the first dual-purpose dynamometer assembly 196 may be duplicated to provide a second dual-purpose dynamometer assembly 198 opposite the first dual-purpose dynamometer assembly 196 with respect to the test chamber 60. Accordingly, the test chamber 60 may be equipped with two opposing dual-purpose dynamometer assemblies 20 where the dynamometer motor 56 of the first dual-purpose dynamometer assembly 196 is positioned adjacent the dynamometer motor 56 of the second dual-purpose dynamometer assembly 198. In other words, the dynamometer motors 56 of the two dual-purpose dynamometer assemblies 196, 198 are positioned end-to-end. Such an arrangement accommodates vehicles that have a pair of driven wheels 24 and/or a pair of powertrain components 26 such as, without limitation, a rear-wheel drive truck 22. It should also be appreciated that all elements of the first dual-purpose dynamometer assembly 196 and the second dual-purpose dynamometer assembly 198 may be duplicated to provide a third dual-purpose dynamometer assembly 200 and a fourth dual-purpose dynamometer assembly 202. Accordingly, the test chamber 60 may be equipped with four dual-purpose dynamometer assemblies 196, 198, 200, 202. In this configuration, the third dual-purpose dynamometer assembly 200 is arranged adjacent to the first dual-purpose dynamometer assembly 196 and the fourth dual-purpose dynamometer assembly 202 is arranged adjacent to the second dynamometer assembly 198 and opposite the second dual-purpose dynamometer assembly 198. In other words, the first dual-purpose dynamometer assembly 196 and the third dual-purpose dynamometer assembly 200 are arranged in parallel with one another and the third dual-purpose dynamometer assembly 200 and the fourth dual-purpose dynamometer assembly 202 are arranged in parallel with one another. Such an arrangement accommodates vehicles that have two pairs of driven wheels 24 and/or two pair of powertrain components 26 such as, without limitation, the semi-truck 22 illustrated in FIGS. 1 and 2.

The foregoing description of the embodiments has been provided for the purposes of illustration and description. It is not intended to be exhaustive or limiting. Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A dual-purpose dynamometer assembly for testing a vehicle having at least one of a wheel and at least one powertrain component, said dual-purpose dynamometer assembly comprising:
   a chassis dynamometer roll configured to engage and be driven by the at least one wheel of the vehicle during testing;
   a powertrain dynamometer shaft configured to mate with and be driven by the at least one powertrain component of the vehicle during testing, said powertrain dynamometer shaft being spaced from said chassis dynamometer roll; and
   a dynamometer motor that is rotatably coupled to said chassis dynamometer roll and said powertrain dynamometer shaft by a gearbox, wherein said gearbox is disposed between said dynamometer motor, said chassis dynamometer roll, and said powertrain dynamometer shaft.

2. A dual-purpose dynamometer assembly as set forth in claim 1 further comprising:
   a test chamber defined by at least one chamber wall, wherein the vehicle is disposed within said test chamber during testing, and wherein said at least one chamber wall is disposed between said dynamometer motor on one side and said chassis dynamometer roll and said powertrain dynamometer shaft on another side such that said dynamometer motor is disposed outside of said test chamber and is isolated from temperatures within said test chamber.

3. A dual-purpose dynamometer assembly as set forth in claim 2 further comprising:
   at least one aperture penetrating said at least one chamber wall through which said dynamometer motor is connected to said chassis dynamometer roll and said powertrain dynamometer shaft.

4. A dual-purpose dynamometer assembly as set forth in claim 3 further comprising:
   a gearbox frame that supports said gearbox; and
   at least one gearbox pivot actuator connected to said gearbox and said gearbox frame that supports and pivots said gearbox relative to said gearbox frame such that said powertrain dynamometer shaft can be aligned with powertrain components of vehicles with different wheelbases.

5. A dual-purpose dynamometer assembly as set forth in claim 3 further comprising:
   a chassis dynamometer frame supporting said chassis dynamometer roll;
   a dynamometer motor frame supporting said dynamometer motor; and
   a gearbox frame rigidly supporting said gearbox, said gearbox frame connecting to said dynamometer motor frame;
   said chassis dynamometer frame, said dynamometer motor frame, and said gearbox frame being mounted on at least one sliding track that permits linear movement of said chassis dynamometer roll, said dynamometer motor, and said gearbox with respect to said at least one chamber wall such that at least one of: (i) said powertrain dynamometer shaft can be aligned with powertrain components of vehicles with different wheelbases, and (ii) said chassis dynamometer roll can be aligned with the wheels of vehicles with different wheelbases.

6. A dual-purpose dynamometer assembly as set forth in claim 3 wherein said at least one chamber wall of said test chamber is disposed between said dynamometer motor on one side and said gearbox on another side such that said dynamometer motor is disposed outside said test chamber and said gearbox is disposed inside said test chamber.

7. A dual-purpose dynamometer assembly as set forth in claim 6 wherein said gearbox includes a housing that is thermally insulated and filled with a fluid that has been thermally conditioned.

8. A dual-purpose dynamometer assembly as set forth in claim 7 further comprising:
a chassis dynamometer axle supporting and being rotatably coupled with said chassis dynamometer roll and wherein said dynamometer motor includes a motor shaft that is rotatably coupled to said chassis dynamometer axle through said gearbox.

9. A dual-purpose dynamometer assembly as set forth in claim 8 wherein said at least one aperture penetrating said at least one chamber wall is a motor shaft aperture that receives said motor shaft such that said dynamometer motor is connected to said gearbox through said motor shaft aperture.

10. A dual-purpose dynamometer assembly as set forth in claim 9 further comprising:
a pair of rotary shaft seals disposed on opposite sides of said at least one chamber wall adjacent said motor shaft aperture that circumscribe said motor shaft to seal off said dynamometer motor from said test chamber.

11. A dual-purpose dynamometer assembly as set forth in claim 10 further comprising:
a first gearbox shaft extending linearly through said housing of said gearbox to rotatably couple said chassis dynamometer axle and said motor shaft; and
a second gearbox shaft spaced from said first gearbox shaft that extends linearly through said housing of said gearbox to align with said powertrain dynamometer shaft, said second gearbox shaft being rotatably coupled with said gearbox.

12. A dual-purpose dynamometer assembly as set forth in claim 11 further comprising:
a chassis dynamometer jackshaft extending between said first gearbox shaft and said chassis dynamometer axle to rotatably coupled said motor shaft of said dynamometer motor with said chassis dynamometer axle.

13. A dual-purpose dynamometer assembly as set forth in claim 12 further comprising:
a first gearbox coupler disposed between said chassis dynamometer jackshaft and said first gearbox shaft including an annular portion extending axially from said chassis dynamometer jackshaft that mates with said first gearbox shaft and a flange extending radially from and circumferentially about said annular portion of said first gearbox coupler that mates with said chassis dynamometer jackshaft to rotatably couple said first gearbox shaft with said chassis dynamometer jackshaft; and
a second gearbox coupler disposed between said powertrain dynamometer shaft and said second gearbox shaft including an annular portion extending axially from said powertrain dynamometer shaft that mates with said second gearbox shaft and a flange extending radially from and circumferentially about said annular portion of said second gearbox coupler that mates with said powertrain dynamometer shaft to rotatably couple said second gearbox shaft with said powertrain dynamometer shaft.

14. A dual-purpose dynamometer assembly as set forth in claim 13 further comprising:
a first torque flange having a disc-like shape circumscribing said annular portion of said first gearbox coupler;
said gearbox including a first torque flange enclosure projecting from said housing of said gearbox to enclose said first torque flange and portions of said first gearbox shaft and said first gearbox coupler that is filled with warm dry air to isolate said first torque flange from the extreme temperatures within said test chamber; and
a second torque flange having a disc-like shape circumscribing said annular portion of said second gearbox coupler;
said gearbox including a second torque flange enclosure projecting from said housing of said gearbox to enclose said second torque flange and portions of said second gearbox shaft and said second gearbox coupler that is filled with warm dry air to isolate said second torque flange from the extreme temperatures within said test chamber.

15. A dual-purpose dynamometer assembly as set forth in claim 14 further comprising:
a first brush seal disposed between said first torque flange and said first torque flange enclosure that circumscribes said annular portion of said first gearbox coupler to seal off said first torque flange enclosure from said test chamber; and
a second brush seal disposed between said second torque flange and said second torque flange enclosure that circumscribes said annular portion of said second gearbox coupler to seal off said second torque flange enclosure from said test chamber.

16. A dual-purpose dynamometer assembly as set forth in claim 3 wherein said at least one chamber wall of said test chamber is disposed between said gearbox on one side and said chassis dynamometer roll on another side such that said dynamometer motor and said gearbox are disposed outside said test chamber and are isolated from extreme temperatures within said test chamber.

17. A dual-purpose dynamometer assembly as set forth in claim 16 further comprising:
a chassis dynamometer jackshaft extending between said gearbox and said chassis dynamometer roll that rotatably couples with said chassis dynamometer roll; and
a powertrain dynamometer jackshaft extending between said gearbox and said powertrain dynamometer shaft that rotatably couples with said powertrain dynamometer shaft.

18. A dual-purpose dynamometer assembly as set forth in claim 17 wherein said at least one aperture includes a first aperture that receives said chassis dynamometer jackshaft such that said chassis dynamometer jackshaft is connected to said gearbox through said first aperture and a second aperture that is spaced from said first aperture and that receives said powertrain dynamometer jackshaft such that said powertrain dynamometer jackshaft is connected to said gearbox through said second aperture.

19. A dual-purpose dynamometer assembly as set forth in claim 18 further comprising:
a gearbox frame that supports said gearbox; and
at least one gearbox pivot actuator connected to said gearbox and said gearbox frame that supports and pivots said gearbox about said chassis dynamometer jackshaft such that said powertrain dynamometer shaft can be aligned with the at least one powertrain component of the vehicle, and wherein said second aperture in said at least one chamber wall has an arctuate slot-like shape to accommodate movement of said powertrain dynamometer jackshaft as said gearbox pivots about said chassis dynamometer jackshaft.

20. A dual-purpose dynamometer assembly as set forth in claim 18 further comprising:
at least one sliding door seal disposed adjacent said at least one chamber wall that covers said first aperture and said second aperture and that includes a first hole in alignment with said first aperture and a second hole in alignment with said second aperture wherein said first hole receives said chassis dynamometer jackshaft and said second hole receives said powertrain dynamometer jackshaft.

21. A dual-purpose dynamometer assembly as set forth in claim 20 further comprising:
a first rotary shaft seal disposed within said first aperture of said at least one chamber wall that circumscribes said chassis dynamometer jackshaft to seal off said dynamometer motor and said gearbox from said test chamber; and
a second rotary shaft seal disposed within said second aperture of said at least one chamber wall that circumscribes said powertrain dynamometer jackshaft to seal off said dynamometer motor and said gearbox from said test chamber.

22. A dual-purpose dynamometer assembly as set forth in claim 21 further comprising:
a wall mount bearing assembly including an annular portion and a flange extending radially from and circumferentially about said annular portion of said wall mount bearing assembly wherein said flange of said wall mount bearing assembly is mounted to said at least one sliding door seal to support said powertrain dynamometer shaft while permitting free rotation of said powertrain dynamometer shaft.

23. A dual-purpose dynamometer assembly as set forth in claim 22 further comprising:
a chassis dynamometer frame supporting said chassis dynamometer roll;
a dynamometer motor frame supporting said dynamometer motor; and
a gearbox frame rigidly supporting said gearbox, said gearbox frame connecting to said dynamometer motor frame;
said chassis dynamometer frame, said dynamometer motor frame, and said gearbox frame being mounted on at least one sliding track that permits linear movement of said chassis dynamometer roll, said dynamometer motor, and said gearbox with respect to said at least one chamber wall such that at least one of: (i) said powertrain dynamometer shaft can be aligned with the at least one powertrain component of the vehicle, and (ii) said chassis dynamometer roll can be aligned with the at least one wheel of the vehicle.

24. A dual-purpose dynamometer assembly as set forth in claim 23 further comprising:
a plurality of sliding door support brackets mounted to said at least one chamber wall and being disposed above and below said at least one sliding door seal to support said at least one sliding door seal on said at least one chamber wall while permitting linear movement of said at least one sliding door seal in response to linear movement of said chassis dynamometer jackshaft and said powertrain dynamometer jackshaft.

25. A dual-purpose dynamometer assembly comprising:
a chassis dynamometer roll for engaging at least one wheel of a vehicle;
a chassis dynamometer axle supporting and being rotatably coupled with said chassis dynamometer roll;
a powertrain dynamometer shaft spaced from said chassis dynamometer axle, said powertrain dynamometer shaft including an input flange for coupling with at least one powertrain component of the vehicle;
a dynamometer motor including a motor shaft;
a gearbox disposed between and rotatably coupling said dynamometer motor with at least one of said chassis dynamometer axle and said powertrain dynamometer shaft; and
at least one gearbox pivot actuator connected to said gearbox that supports and pivots said gearbox about said motor shaft of said dynamometer motor such that said powertrain dynamometer shaft can be aligned with the at least one powertrain component of the vehicle.

26. A dual-purpose dynamometer assembly as set forth in claim 25 wherein said dual-purpose dynamometer assembly is a first dual-purpose dynamometer assembly.

27. A dual-purpose dynamometer assembly as set forth in claim 26 wherein all elements of said first dual-purpose dynamometer assembly are duplicated to provide a second dual-purpose dynamometer assembly opposite said first dual-purpose dynamometer assembly.

28. A dual-purpose dynamometer assembly as set forth in claim 27 wherein all elements of said first dual-purpose dynamometer assembly and said second dual-purpose dynamometer assembly are duplicated to provide a third dual-purpose dynamometer assembly and a fourth dual-purpose dynamometer assembly with said third dual-purpose dynamometer assembly being arranged adjacent to said first dual-purpose dynamometer assembly and said fourth dual-purpose dynamometer assembly being arranged adjacent to said second dynamometer assembly and opposite said third dual-purpose dynamometer assembly.

29. A dual-purpose dynamometer assembly comprising:
a chassis dynamometer roll for engaging at least one wheel of a vehicle;
a chassis dynamometer axle supporting and being rotatably coupled with said chassis dynamometer roll;
a powertrain dynamometer shaft spaced from said chassis dynamometer axle, said powertrain dynamometer shaft including an input flange for coupling with at least one powertrain component of the vehicle;
a dynamometer motor including a motor shaft that is rotatably coupled to at least one of said chassis dynamometer axle and said powertrain dynamometer shaft;
a gearbox disposed between and rotatably coupling said dynamometer motor with said chassis dynamometer axle and said powertrain dynamometer shaft; and
said chassis dynamometer roll, said dynamometer motor, and said gearbox being supported on at least one sliding track that permits linear movement of said chassis dynamometer roll, said dynamometer motor, and said gearbox and with respect to the vehicle such that at least one of: (i) said powertrain dynamometer shaft can be aligned with the at least one powertrain component of the vehicle, and (ii) said chassis dynamometer roll can be aligned with the at least one wheel of the vehicle.

30. A dual-purpose dynamometer assembly as set forth in claim 29 wherein said dual-purpose dynamometer assembly is a first dual-purpose dynamometer assembly.

31. A dual-purpose dynamometer assembly as set forth in claim 30 wherein all elements of said first dual-purpose dynamometer assembly are duplicated to provide a second dual-purpose dynamometer assembly opposite said first dual-purpose dynamometer assembly.

32. A dual-purpose dynamometer assembly as set forth in claim 31 wherein all elements of said first dual-purpose dynamometer assembly and said second dual-purpose dynamometer assembly are duplicated to provide a third dual-purpose dynamometer assembly and a fourth dual-purpose dynamometer assembly with said third dual-purpose dynamometer assembly being arranged adjacent to said first dual-purpose dynamometer assembly and said fourth dual-purpose dynamometer assembly being arranged adjacent to said second dynamometer assembly and opposite said third dual-purpose dynamometer assembly.

\* \* \* \* \*

UNITED STATES PATENT AND TRADEMARK OFFICE
CERTIFICATE OF CORRECTION

PATENT NO. : 9,752,961 B2  
APPLICATION NO. : 14/730689  
DATED : September 5, 2017  
INVENTOR(S) : Kenneth Cooper Barnes et al.

Page 1 of 1

It is certified that error appears in the above-identified patent and that said Letters Patent is hereby corrected as shown below:

Column 19  
Line 42, Claim 11, after "said" insert --first gearbox shaft through a plurality of gears disposed inside said housing of said--.

Signed and Sealed this  
Twelfth Day of December, 2017

Joseph Matal  
*Performing the Functions and Duties of the*  
*Under Secretary of Commerce for Intellectual Property and*  
*Director of the United States Patent and Trademark Office*